US011729453B2

(12) United States Patent
Wong et al.

(10) Patent No.: US 11,729,453 B2
(45) Date of Patent: *Aug. 15, 2023

(54) APPARATUS AND METHODS FOR PERSONALIZED CONTENT SYNCHRONIZATION AND DELIVERY IN A CONTENT DISTRIBUTION NETWORK

(71) Applicant: CHARTER COMMUNICATIONS OPERATING, LLC, St. Louis, MO (US)

(72) Inventors: Curt Wong, Bellevue, WA (US); Sami Makinen, Littleton, CO (US); Maulik Vaidya, Escondido, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,136

(22) Filed: Jan. 4, 2021

(65) Prior Publication Data

US 2021/0160562 A1    May 27, 2021

Related U.S. Application Data

(62) Division of application No. 16/393,745, filed on Apr. 24, 2019, now Pat. No. 10,887,647.

(51) Int. Cl.
*H04N 21/43* (2011.01)
*H04N 21/422* (2011.01)
*H04N 21/262* (2011.01)

(52) U.S. Cl.
CPC ....... *H04N 21/4307* (2013.01); *H04N 21/262* (2013.01); *H04N 21/42221* (2013.01); *H04N 21/4305* (2013.01)

(58) Field of Classification Search
None
See application file for complete search history.

(56) References Cited

U.S. PATENT DOCUMENTS

| 6,161,137 A | 12/2000 | Ogdon et al. |
| 6,223,222 B1 | 4/2001 | Fijolek et al. |

(Continued)

FOREIGN PATENT DOCUMENTS

| EP | 3044703 | 2/2017 |
| GB | 2495159 A | 4/2013 |
| KR | 20140002008 A | 1/2014 |

OTHER PUBLICATIONS

Fernanda, et al., : "Anycast as a Load Balancing feature", USENIX, Aug. 27, 2010 (Aug. 27, 2010), pp. 1-4, XP061010498, [retrieved on Aug. 27, 2010].

(Continued)

*Primary Examiner* — June Sison
(74) *Attorney, Agent, or Firm* — Patent Beach PC

(57) ABSTRACT

Apparatus and methods for providing an enriched content services over a network. In one embodiment, the exemplary apparatus and methods leverage extant high-bandwidth capabilities of a managed network for delivering content downstream, as well as standards-compliant ultra-low latency and high data rate services (e.g., 5G NR services) for uploading content. In one embodiment, the exemplary apparatus and methods are implemented to synchronize content delivered of extant HFC architectures and DOCSIS protocols with user-generated or other content uploaded to a network entity (e.g., server apparatus) via an IP connection established utilized 5G NR services. Additional features include, among other, enhancements which enable user participation individually, or with other subscribers, in live or recorded content-based activities (such as e.g., auction- (Continued)

ing, broadcasting, interactive commentary/gaming, exercising, etc.).

21 Claims, 12 Drawing Sheets

(56) References Cited

U.S. PATENT DOCUMENTS

| | | | |
|---|---|---|---|
| 6,810,417 B2 | 10/2004 | Lee | |
| 7,154,898 B1 | 12/2006 | Pecus et al. | |
| 8,073,940 B1 | 12/2011 | Richardson et al. | |
| 8,301,776 B2 | 10/2012 | Hebert et al. | |
| 8,386,629 B2 | 2/2013 | Tan et al. | |
| 8,468,271 B1 | 6/2013 | Panwar et al. | |
| 8,954,491 B1 | 2/2015 | Medved et al. | |
| 9,130,970 B2 | 9/2015 | Carney et al. | |
| 9,160,809 B2 | 10/2015 | Carney et al. | |
| 9,235,547 B1 | 1/2016 | Hartman et al. | |
| 9,350,706 B1 | 5/2016 | Smith et al. | |
| 9,743,142 B2 | 8/2017 | Cholas et al. | |
| 9,755,950 B2 | 9/2017 | Butler et al. | |
| 9,847,844 B2 | 12/2017 | Schooling et al. | |
| 9,954,646 B1 | 4/2018 | Marcin et al. | |
| 10,306,174 B1 | 5/2019 | Grafton et al. | |
| 2001/0018772 A1 | 8/2001 | Shibata et al. | |
| 2001/0049740 A1 | 12/2001 | Karpoff | |
| 2002/0059621 A1 | 5/2002 | Thomas et al. | |
| 2002/0087976 A1 | 7/2002 | Kaplan et al. | |
| 2002/0116529 A1 | 8/2002 | Hayden | |
| 2002/0142750 A1 | 10/2002 | Gill | |
| 2003/0110509 A1 | 6/2003 | Levinson et al. | |
| 2003/0197785 A1 | 10/2003 | White et al. | |
| 2003/0211839 A1 | 11/2003 | Baum et al. | |
| 2004/0010588 A1 | 1/2004 | Slater et al. | |
| 2004/0017769 A1 | 1/2004 | Denecheau et al. | |
| 2004/0039844 A1 | 2/2004 | Bonn | |
| 2005/0089050 A1 | 4/2005 | Cheriton | |
| 2006/0198394 A1 | 9/2006 | Gotoh et al. | |
| 2007/0011717 A1 | 1/2007 | Lauder et al. | |
| 2007/0101379 A1 | 5/2007 | Pereira et al. | |
| 2007/0107010 A1 | 5/2007 | Jolna et al. | |
| 2008/0115167 A1 | 5/2008 | Hermsmeyer et al. | |
| 2009/0083279 A1 | 3/2009 | Hasek | |
| 2009/0100459 A1 | 4/2009 | Riedl et al. | |
| 2009/0138601 A1 | 5/2009 | Hebert et al. | |
| 2009/0161674 A1 | 6/2009 | Bou-Diab et al. | |
| 2009/0210899 A1 | 8/2009 | Lawrence-Apfelbaum et al. | |
| 2009/0210912 A1 | 8/2009 | Cholas et al. | |
| 2009/0217324 A1 | 8/2009 | Massimi | |
| 2009/0248886 A1 | 10/2009 | Tan et al. | |
| 2009/0260046 A1 | 10/2009 | Yang | |
| 2009/0313330 A1 | 12/2009 | Sakamoto | |
| 2010/0115565 A1 | 5/2010 | Fujihira et al. | |
| 2010/0121969 A1 | 5/2010 | Levitan | |
| 2010/0128918 A1 | 5/2010 | Macwan | |
| 2010/0231790 A1 | 9/2010 | Ansari et al. | |
| 2010/0313223 A1 | 12/2010 | Straub | |
| 2010/0332595 A1 | 12/2010 | Fullagar et al. | |
| 2011/0107379 A1 | 5/2011 | Lajoie et al. | |
| 2011/0131180 A1 | 6/2011 | Tuli et al. | |
| 2011/0154213 A1 | 6/2011 | Wheatley et al. | |
| 2011/0302600 A1 | 12/2011 | Kelsen et al. | |
| 2012/0008786 A1 | 1/2012 | Cronk et al. | |
| 2012/0023535 A1 | 1/2012 | Brooks | |
| 2012/0038550 A1 | 2/2012 | Lemmey et al. | |
| 2012/0110202 A1 | 5/2012 | Niman | |
| 2012/0124606 A1 | 5/2012 | Tidwell et al. | |
| 2012/0151012 A1 | 6/2012 | Mustafa | |
| 2012/0317598 A1 | 12/2012 | Gilson | |
| 2013/0018978 A1 | 1/2013 | Crowe et al. | |
| 2013/0039442 A1 | 2/2013 | Smallcomb et al. | |
| 2013/0104180 A1 | 4/2013 | Knightbridge | |
| 2013/0121339 A1 | 5/2013 | Dispensa et al. | |
| 2013/0159472 A1 | 6/2013 | Newton et al. | |
| 2013/0188645 A1 | 7/2013 | Mack-Crane | |
| 2013/0262697 A1 | 10/2013 | Karasaridis et al. | |
| 2013/0268856 A1 | 10/2013 | Hejl, Jr. et al. | |
| 2013/0318195 A1 | 11/2013 | Kwapniewski et al. | |
| 2013/0340018 A1 | 12/2013 | Li et al. | |
| 2014/0006158 A1 | 1/2014 | Cooper | |
| 2014/0062866 A1 | 3/2014 | Yamashita | |
| 2014/0071344 A1* | 3/2014 | Francisco | H04N 21/242 348/500 |
| 2014/0082645 A1* | 3/2014 | Stern | H04N 21/4788 725/23 |
| 2014/0092254 A1 | 4/2014 | Mughal et al. | |
| 2014/0247964 A1 | 9/2014 | Kurokawa et al. | |
| 2014/0321561 A1 | 10/2014 | Stec et al. | |
| 2015/0003517 A1 | 1/2015 | Misumi | |
| 2015/0063249 A1 | 3/2015 | Jover et al. | |
| 2015/0074187 A1 | 3/2015 | Fletcher et al. | |
| 2015/0074697 A1 | 3/2015 | Van Vleck et al. | |
| 2016/0239259 A1 | 8/2016 | Lenchner et al. | |
| 2017/0003740 A1 | 1/2017 | Verfaillie et al. | |
| 2017/0026712 A1 | 1/2017 | Gonder et al. | |
| 2017/0034237 A1 | 2/2017 | Silver | |
| 2018/0097690 A1 | 4/2018 | Yocam et al. | |
| 2019/0069004 A1* | 2/2019 | Badawiyeh | H04N 21/44016 |
| 2019/0069037 A1 | 2/2019 | Murphy | |
| 2019/0089997 A1* | 3/2019 | Badawiyeh | H04N 21/23424 |
| 2019/0182554 A1 | 6/2019 | Schupak et al. | |
| 2020/0083987 A1 | 3/2020 | Xu et al. | |
| 2020/0186575 A1* | 6/2020 | Rofe | H04L 7/0041 |
| 2020/0204603 A1* | 6/2020 | Upadhyaya | H04L 65/4076 |
| 2020/0344515 A1 | 10/2020 | Wong et al. | |
| 2021/0120315 A1 | 4/2021 | Makinen et al. | |

OTHER PUBLICATIONS

Marques, et al., "Advertisement of the best external route in BGP; draft-ietf-idr-best-external-05.txt", Advertisement of the Best External Route in BGP; Draft-IETF-IDR-Best-External-05.txt, Internet Engineering Task Force, IETF; Standardworkingdraft, Internet Society (ISOC) 4, Rue Des Falaises CH—1205 Geneva, Switzerland, Jan. 3, 2012 (Jan. 3, 2012), pp. 1-21, XP015079961, [retrieved on Jan. 3, 2012].

Mohapatra, et al., "Fast Connectivity Restoration Using BGP Addpath; draft-pmohapat-idr-fast-conn-restore-03. txt", Fast Connectivity Restoration Using BGP Add-Path; Draft-PMOHAPAT-IDR-Fast-Conn-Restore-03.txt, Internet Engineering Task Force, IETF; Standardworkingdraft, Internet Society (ISOC) 4, Rue Des Falaises CH—1205 Geneva, Switzerland, Jan. 22, 2013 (Jan. 22, 2013), pp. 1-19, XP015089608, [retrieved on Jan. 22, 2013].

Raszuk, et al. "Distribution of Diverse BGP Paths; RFC6774.txt", Distribution of Diverse BGP Paths; RFC6774.txt, Internet Engineering Task Force, IETF; Standard, Internet Society (ISOC) 4, Rue Des Falaises CH—1205 Geneva, Switzerland, Nov. 6, 2012 (Nov. 6, 2012), pp. 1-22, XP015086470, [retrieved on Nov. 6, 2012].

* cited by examiner

APPARATUS AND METHODS FOR PERSONALIZED CONTENT SYNCHRONIZATION AND DELIVERY IN A CONTENT DISTRIBUTION NETWORK

PRIORITY

This application is a divisional of and claims the benefit of priority to U.S. patent application Ser. No. 16/393,745 entitled "APPARATUS AND METHODS FOR PERSONALIZED CONTENT SYNCHRONIZATION AND DELIVERY IN A CONTENT DISTRIBUTION NETWORK" and filed Apr. 24, 2019, issuing as U.S. Pat. No. 10,887,647, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content delivery, and specifically in one exemplary aspect to an architecture which integrates or unifies alternately sourced content (e.g., uploaded user-generated content) with network programming (e.g., television shows, live-events, etc.) via synchronization of at least two different content streams.

2. Description of Related Technology

The proliferation of the Internet and increased connection technologies such as broadband have contributed to the development of new media sources for information and entertainment. Accordingly, new and interesting opportunities for providing users with advanced features, applications and services have arose, such as to enable users to create, tailor, or otherwise interact with, video clips/scenes to their interests and liking.

For example, uploaded content is often broadly shared with other users via social media such as Youtube or the like. Real-time commentator type of broadcasting is also very popular for gamers (e.g., Twitch) to allow audiences to participate in and comment on the actions being played by gainers. Other programs and services, such as Snapchat and Instagram, provide tools for altering uploaded content (e.g. changing clip duration, zooming, adding audio or text commentary, cropping, filter effects, etc.) before broadcasting to others.

Managed Content Distribution Networks

Network operators deliver data services (e.g., broadband) and video products, including the above-described services, to customers using a variety of different devices, thereby enabling their users or subscribers to access data/content in a number of different contexts, both fixed (e.g., at their residence) and mobile (such as while traveling or away from home). FIG. 1 is a functional block diagrams illustrating a typical prior art managed (e.g., cable) content delivery network architecture used to provide such data services to its users and subscribers.

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

Within the cable plant, VOD and so-called switched digital video (SDV) may also be used to provide content, and utilize a single-program transport stream (SPTS) delivery modality. In U.S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels.

In most cable networks, programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps <38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as SD. For an exemplary MPEG-2 Main Profile—High Level (MP@HL) video compression, each HD program requires around 15 Mbps bitrate.

Content Fusion

In order to overlay the aforementioned user-generated content (e.g., text, audio and video) with network programming (e.g., television shows, live-events, etc.) carried over e.g., the MSO network of FIG. 1, the overlaid content and network programming content generally have to be combined externally (at a centralized network entity or via third party Internet-based servers), or provided separately to be combined at the cable modem (which may require explicit time synchronization). Accordingly, the user-generated content must be uploaded to the centralized network entity or via third party Internet based servers, using upstream bandwidth on the managed network or those networks serving such third party Internet based servers.

However, the download capability of the extant managed network infrastructure (e.g., FIG. 1) has a much larger bandwidth than upstream capability. For example, a typical upload (UL) speed is about 5 Mbps while download (DL) can be up to 100 Mbps (see, e.g., http://www.dslreports.com/faq/15643). For the UL latency, a typical value can be in the range of 20-50 ms (see e.g., "Latency Reduction for Mobile Backhaul by Pipelining LTE and DOCSIS," 2017 IEEE Global Communications Conference, 4-8 Dec. 2017, which is incorporated herein by reference in its entirety). Therefore, there will be some discrepancy between the time references associated with when the user viewed given content sent via a download, and the content the user sends via upload to be integrated with the content sent download. This is especially true where there is a wide range or variability in performance across one or both of the delivery channels (e.g., highly variable latency and/or bandwidth).

Accordingly, improved apparatus and methods are needed to, inter alfa, synchronize the two or more different media streams (e.g., one stream carrying network programming and another carrying the user content) such that the network programming and user content are overlaid or combined with the correct time sequence in a composite content stream. Such methods and apparatus would advantageously leverage stable mechanisms for the delivery (e.g., upload) so as to enable predictable and stable transport for, inter alfa, synchronization of the constituent data streams.

SUMMARY

The present disclosure addresses the foregoing needs by providing, inter alfa, methods and apparatus for generation of synchronized content are disclosed.

In a first aspect, a computerized network server apparatus configured to provide an enhanced content stream to one or more users of a content delivery network is disclosed. In one embodiment, the computerized network server apparatus includes: a storage entity; at least one network interface; and a digital processor apparatus in data communication with the storage entity and the at least one network interface, the digital processor apparatus configured to run at least one computer program thereon.

In one variant, the computer program includes a plurality of instructions which are configured to, when executed: receive first digital content via a first transport mechanism; receive second digital content via a second transport mechanism; receive control signaling; generate the enhanced content stream, the enhanced content stream comprising the first and second digital content, the first and second digital content of the enhanced content stream being synchronized based on the control signaling; and provide the enhanced content stream to the one or more users of the content delivery network.

In one implementation, the plurality of instructions are further configured to, when executed: transmit one or more audio signals to a first computerized client device, the one or more audio signals corresponding to one or more respective time references, the first computerized client device configured to transmit the one or more audio signals to a second computerized client device; and wherein the receipt of the control signaling comprising receipt of the one or more audio signals from the second computerized client device.

In another implementation, the plurality of instructions are further configured to, when executed: estimate a delay parameter based on the control signaling; and wherein the generation of the enhanced content stream includes an adjustment, based on the delay parameter, of a time of playback associated with the first or second digital content, the adjustment causing the synchronization of the first and second digital content.

In yet another implementation, the plurality of instructions are further configured to, when executed: generate a composite content stream, the composite content stream comprising both the first and second digital content, wherein respective time references associated with the first and second digital content of the composite content stream are not synchronized; and transmit the composite content stream to a first computerized client device. The receipt of the control signaling (i) is based on a display of the composite content stream by the first computerized client device to a user of a second computerized client device, and (ii) comprising receipt of the control signaling from the second computerized client device; the control signaling includes data representative of a delay parameter; the generation of the enhanced content stream includes an adjustment, based on the delay parameter, of a time of playback associated with the first or second digital content, the adjustment causing the synchronization of the first and second digital content.

In another aspect, a method of providing enhanced digitally rendered content to one or more users of a content distribution network is disclosed. In one embodiment, the method includes: receiving first digital content via a first transport, the first transport comprising a fixed transport mechanism of the content distribution network; receiving second digital content via a second transport, the second transport being an ad hoc transport mechanism operating independent of the content distribution network and having a prescribed minimum performance characteristic; generating an enhanced digitally rendered content stream, the enhanced digitally rendered content stream comprising at least a portion of the first digital content and at least a portion of the second digital content, the at least portions of the first digital content and the second digital content having a temporal relationship based at least in part on the prescribed minimum performance characteristic; and distributing the enhanced digitally rendered content stream to the one or more users of the content distribution network via the content distribution network.

In one variant, the generating an enhanced digitally rendered content stream includes generating the enhanced digital content stream using a digital encoder apparatus of the content distribution network.

In one implementation, the first transport includes a downstream radio frequency (RF) channel of a hybrid fiber coaxial (HFC) content distribution network, and the second transport includes a wireless 5G NR (New Radio) bearer compliant with at least 3GPP Release 15, the second transport established ad hoc between a user device and the digital encoder apparatus of the content distribution network, the user device configured to generate the second digital content.

In another implementation, the method further includes: receiving control signaling data at the digital encoder apparatus of the content distribution network; and utilizing the received control signaling data to synchronize the at least portions of the first digital content and the second digital content.

In another implementation, the utilizing the received control signaling data to synchronize comprising using the received control signaling data to determine a latency associated with at least (i) the downstream radio frequency (RF) channel, and (ii) the user device.

In another variant of the method, the generating an enhanced digitally rendered content stream is based at least in part on the prescribed minimum performance characteristic comprising a 3GPP 5G NR (New Radio) maximum latency value.

In yet another variant, the generating an enhanced digitally rendered content stream comprising at least a portion of the first digital content and at least a portion of the second digital content, the at least portions of the first digital content and the second digital content having a temporal relationship based at least in part on the prescribed minimum performance characteristic, includes generating a composite digitally rendered content stream comprising the at least second digital content overlaid onto the first digital content.

In still a further variant, the generating an enhanced digitally rendered content stream comprising at least a portion of the first digital content and at least a portion of the second digital content, the at least portions of the first digital content and the second digital content having a temporal relationship based at least in part on the prescribed minimum performance characteristic, includes generating a composite digitally rendered content stream comprising at least some frames of the at least second digital content interleaved with frames of the first digital content.

In another aspect, a method of synchronizing first digitally rendered content and second digitally rendered content so as to enable delivery of a synchronized composite digital content stream to one or more users of a content distribution network is disclosed. In one embodiment, the method includes: causing transmission of test data to a first computerized user device served by the content distribution network, the test data configured to generate a test pattern, the test pattern configured to be detectable by a second computerized user device served by at least a wireless bearer having prescribed performance characteristics; receiving data from the second computerized user device relating to reception of the generation of the test pattern by the first computerized user device; and utilizing at least the data received from the second computerized user device to determine a synchronization correction or offset to be applied to at least one of the first digitally rendered content and the second digitally rendered content to enable generation of the synchronized composite digital content stream.

In one variant, the method further includes transmitting the synchronized composite digital content stream to the first computerized user device served via the content distribution network concurrent with receiving the second digitally rendered content from the second computerized user device.

In another variant, the causing transmission of test data to a first computerized user device served by the content distribution network, the test data configured to generate a test pattern, the test pattern configured to be detectable by a second computerized user device, includes transmitting audio test data have a prescribed total pattern or sequence, the prescribed tonal pattern or sequence configured to facilitate delay estimation by a delay estimation processing process. The utilizing at least the data received from the second computerized user device to determine a synchronization correction or offset may include for example using data related to the prescribed tonal pattern or sequence received by the second computerized user device as an input to a delay estimation processing process operative to run on the second computerized user device.

In one implementation, the at least the receiving and utilizing are performed by a network encoding server process, and the utilizing at least the data received from the second computerized user device to determine a synchronization correction or offset further includes transmitting data related to the prescribed tonal pattern or sequence received by the second computerized user device to a delay estimation processing process operative to run on the network encoding server process.

The method may further include receiving adjustment data transmitted from the second computerized user device, the adjustment data based at least on a user input via a user interface of the second computerized user device, the user input relating to at least one of: (i) an advancement of timing of the second digitally rendered content relative to the first digitally rendered content; and/or (ii) a retarding of timing of the second digitally rendered content relative to the first digitally rendered content; and utilizing the received adjustment data as part of the determination of the synchronization.

In another aspect, a mobile computerized device capable of contributing to and controlling content enhancement or enrichment is disclosed and described. In one embodiment, the device comprises a personal or laptop computer. In another embodiment, the device comprises a mobile device (e.g., tablet or smartphone). In another embodiment, the device comprises a computerized "smart" television or rendering device.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In yet another embodiment, the apparatus comprises a "cloud" (network) based storage device which is remote from yet accessible via a computerized user or client electronic device. In yet another embodiment, the apparatus comprises a "fog" (network) based storage device which is distributed across multiple nodes of varying proximity and accessible via a computerized user or client electronic device.

In yet another aspect, a software architecture is disclosed. In one embodiment, the architecture includes an application layer process configured to run on a 5G capable CPE, and which is accessible via e.g., MSO or external application overlay servers, and mobile devices of the user.

In another aspect of the present disclosure, a non-transitory computer-readable apparatus is disclosed. In one embodiment thereof, the non-transitory computer-readable apparatus includes a storage medium, the storage medium including a plurality of computer-executable instructions configured to, when executed by a processor apparatus, cause a computerized network apparatus to at least: receive a first type of content via a first data communications infrastructure; receive a second type of content via at least a wireless data communications infrastructure; and based at least on second control signal data received via the wireless data communications infrastructure at the computerized network apparatus, generate synchronized combined content using at least the received first and second types of content.

In another aspect of the present disclosure, a method of generating synchronized digital content data for use within a digital content distribution network is disclosed. In one embodiment, the method includes: obtaining first digital content data via a first mode of digital data communication; obtaining second digital content data via a second mode of digital data communication; and generating synchronized digital content data based at least in part on (i) the first digital content data and (ii) the second digital content data.

In another aspect of the present disclosure, a computerized network apparatus is disclosed. In one embodiment, the computerized network apparatus includes: a first data interface configured to perform data communication with a first client device; a second data interface configured to perform data communication with a second client device; a non-transitory computer-readable apparatus including a storage medium, the storage medium including a plurality of instructions configured to, when executed by a processor apparatus, cause the computerized network apparatus to at least: receive first digital content data from the digital content distribution network via the first data interface; receive second digital content data from the second client device via the second data interface, the second digital content data including user-generated digital content data; and generate a composite digital content data stream based at least on synchronization of the first digital content data and the user-generated digital content data.

These and other aspects shall become apparent when considered in light of the disclosure provided herein.

Figure 1:
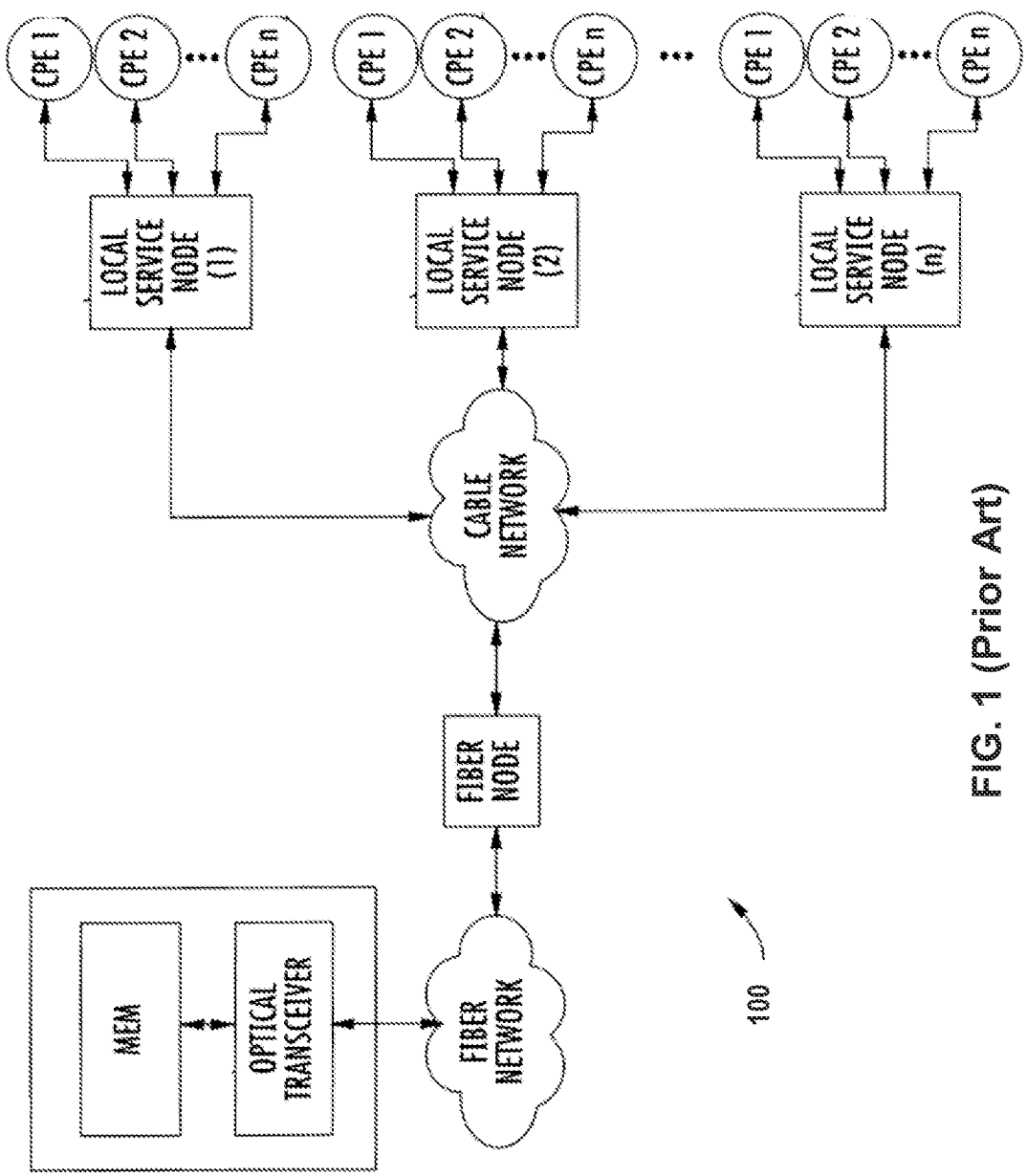
FIG. 1 is a functional block diagram illustrating a typical prior art managed (e.g., cable) content delivery network architecture.

All figures © Copyright 2017-2019 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle telematics or infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, "transmit" and "transmission" of data include without limitation transmitting packetized digital data, whether in wired or wireless fashion. Wireless transmission of data may be accomplished via various means, including via interfaces using IEEE Std. 802.11 (e.g., WLAN Wi-Fi) or 3GPP-based (e.g., 3G, 4G LTE, LTE-U, LTE-LAA, LTE-A, 4G/4.5G/5G) protocols. Such transmission allows a client device (e.g., smartphone, laptop, tablets) to download or stream the data from the transmitting entity.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alfa, the "Wi-Fi Peer-to-Peer (P2P) Specification", incorporated herein by reference in its entirety).

As used herein, the term "xNB" refers to any 3GPP-compliant node including without limitation eNBs (eUTRAN) and gNBs (5G NR).

Overview

In one exemplary aspect, the present disclosure provides improved architectures, methods and apparatus for providing an enriched video stream (EVS) which, inter alfa, leverages existing managed network (e.g., cable network) infrastructure, as well as highly stable and low-latency infrastructure (e.g., 3GPP 5G/NG-RAN) for upload content/video feeds. The disclosed architectures, methods and apparatus enable media synchronization between two or more different media streams (e.g., network programming, and personal/user content) such that the network programming and personal/user content are combined (overlaid or superimposed in one variant) with the correct time sequence within the EVS.

Additionally, the disclosed architectures, methods and apparatus advantageously overcome uplink bandwidth and latency issues existing with respect to many current managed network configurations (e.g., those associated with DOCSIS modems in an MSO cable network).

In one embodiment, a Hybrid Fiber Coax (HFC) plant infrastructure and extant protocols (e.g., DOCSIS) are used as bases for downlink provision of network programming; in conjunction, ultra-low latency and high data rate services (e.g., 5G NR services) are used for uplink, including provision of user content (e.g., user-generated content generated from their mobile device, CPE at their premises, etc.).

Additionally, an overlay encoding server (OES) apparatus is provided which, in various embodiments, uses control signaling to either temporally advance or delay the uploaded content with respect to the network programming to which it is being associated/fused in order to create the EVS with proper time framing for both/all content streams. In one variant, the control signaling is created via a manual adjustment process. In an alternative variant, the control signaling is created via a time-synchronization based automation process.

Specifically, in one implementation, the manual adjustment method includes provision from the OES of a composite content stream (i.e., a stream having both the network programming and user content overlaid with unsynchronized time references) to consumer premises equipment (e.g., a smart TV or set-top box (STB)), which then displays the composite content stream to a user.

With respect to the time-synchronization based automation, in one implementation, before the OES combines the uploaded content from client device (e.g., a smartphone) with the network programming, the OES first performs a delay estimation by sending an audio/test tone to the CPE. The client device (e.g., a smartphone) detects the audio/test tone from the CPE and sends it, via the control signaling, to the OES. This creates a feedback loop for the OES to estimate the delay factor between the time that the user sees the video on the CPE and the uploaded content reaches the OES.

Advantageously, in exemplary embodiments, the foregoing architecture, apparatus and methods allow a user to easily enhance their video for consumption by one or more other viewers, thereby increasing video usage and demand for network services.

Detailed Description of Exemplary Embodiments

Exemplary embodiments of the apparatus and methods of the present disclosure are now described in detail. While these exemplary embodiments are described in the context of a managed network (e.g., hybrid fiber coax (HFC) cable) architecture having a service provider (e.g., multiple systems operator (MSO)), digital networking capability, IP delivery capability, a plurality of client devices, and wireless access nodes (e.g., gNBs) associated therewith or supported at least in part thereby, the general principles and advantages of the disclosure may be extended to other types of networks and architectures that are configured to deliver digital data (e.g., text, images, games, software applications, video and/or audio), whether managed or unmanaged. Such other networks or architectures may be broadband, narrowband, wired or wireless, or otherwise, the following therefore being merely exemplary in nature.

It will also be appreciated that while described generally in the context of a network providing service to a customer or consumer or end user or subscriber (e.g., residential, within a prescribed service area, venue, or other type of premises) end user domain, the present disclosure may be readily adapted to other types of environments including, e.g., commercial/enterprise (e.g., businesses) and government/military applications. Myriad other applications are possible.

Also, while certain aspects are described primarily in the context of the well-known Control Protocol (described in, inter alia, RFC 3611 and 3550), it will be appreciated that the present disclosure may utilize other types of protocols (and in fact bearer networks to include other internets and intranets) to implement the described functionality.

Finally, while described primarily in terms of 3GPP 5G NR (New Radio) technology for, inter alia, provision of the stable, low-latency backhauls or uplinks, the various aspects of the present disclosure are in no way so limited, and in fact other types of bearers or technologies which provide suitably stable and low-latency capability may be substituted, whether wireless or wireline.

Other features and advantages of the present disclosure will immediately be recognized by persons of ordinary skill in the art with reference to the attached drawings and detailed description of exemplary embodiments as given below.

Service Provider Network—

Figure 2A:
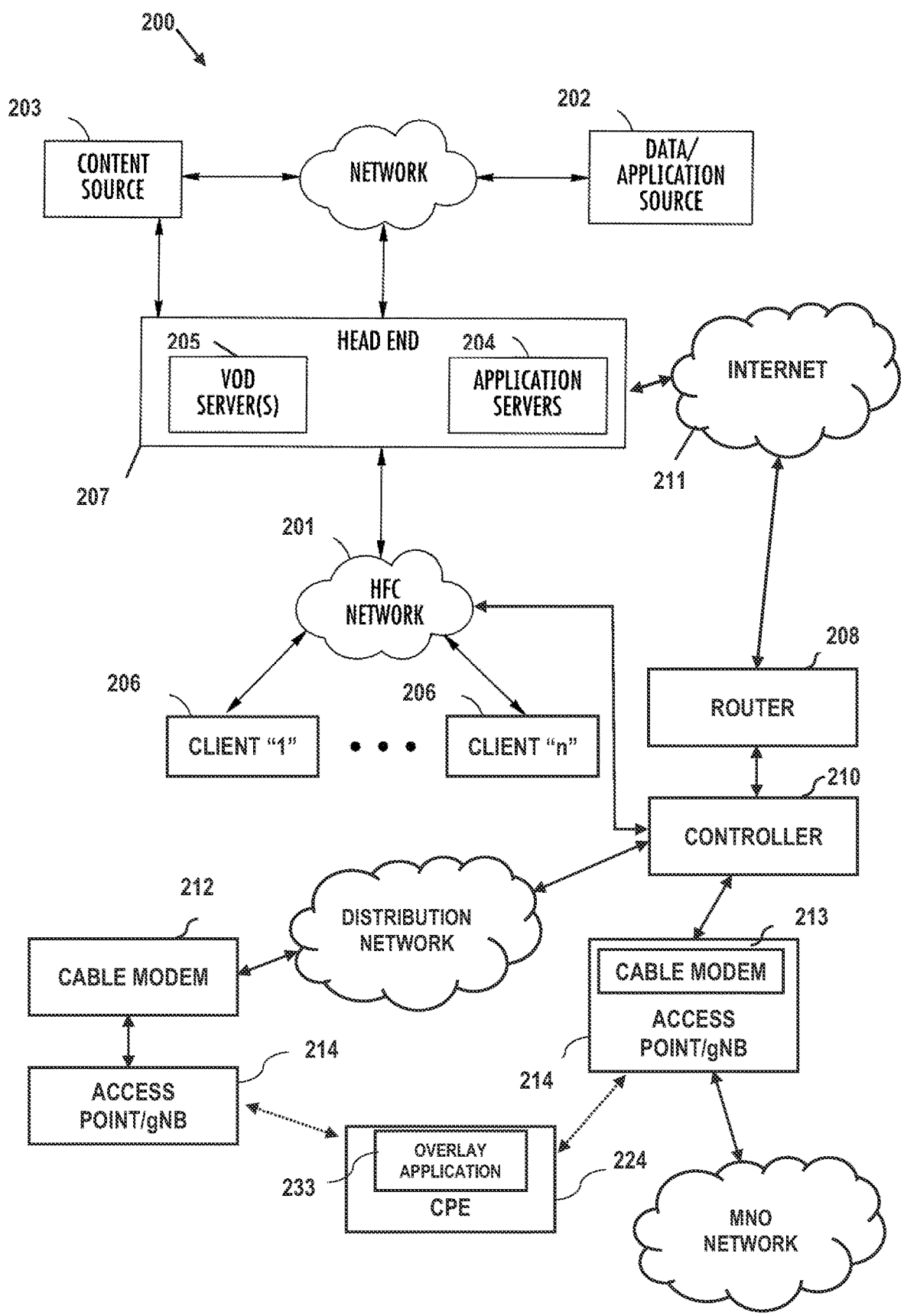
FIG. 2a is a functional block diagram illustrating an exemplary hybrid fiber network configuration useful with various aspects of the present disclosure.

FIG. 2a illustrates a typical service provider network configuration useful with the content fusion/combination functionality and supporting 5G-based wireless network(s) described herein.

The exemplary service provider network 200 is used in one embodiment of the disclosure to provide backbone and Internet access from the service provider's wireless access nodes (e.g., xNBs, Wi-Fi APs, or base stations 214 operated or maintained by the service provider or its customers/subscribers, including cases where the subscriber leases the device for use), one or more stand-alone or embedded cable modems (CMs) 212, 213 in data communication therewith, or even third party access points accessible to the service provider via, e.g., an interposed network such as the Internet 211 (e.g., with appropriate permissions from the access node owner/operator/user). As discussed in greater detail elsewhere herein, the exemplary xNB nodes 214 include the capability of communication with served nodes such as the CPE 224 discussed infra for, inter alfa, low-latency and stable backhaul for user content (e.g., upload of locally generated video data).

As described in greater detail subsequently herein with respect to FIGS. 3 and 3a, one or more MSO network controllers 210 may be utilized in conjunction with CPE-based controller logic 233 for, inter alfa, utilization of the wireless network access nodes 214 at least partly by the MSO so as to optimize delivery of uploaded content from the target CPE e24 to the network. As opposed to an unmanaged network, the managed service-provider network 200 of FIG. 2a advantageously allows, inter alfa, control and management of a given user's access (such user which may be a network subscriber, or merely an incidental/opportunistic user of the service) via the wireless access node(s) 214, including imposition and/or reconfiguration of various access "rules" or other configurations applied to the wireless access nodes.

Moreover, the integrated service provider network architecture 200 allows components at a served premises or venue of interest (e.g., gNBs, Wi-Fi APs and any supporting infrastructure such as routers, switches, etc.) to be remotely and dynamically reconfigured by the network MSO, based on e.g., prevailing operational conditions in the network, changes in user population and/or makeup of users at the venue, business models (e.g., to maximize profitability or provide other benefits such as enhanced user experience, as described infra), or even simply to enhance user experience using one RAT (e.g., 5G NR) when another RAT (e.g., WLAN is sub-optimal for whatever reason), or vice versa. It also permits communication of data from the xNBs backwards towards the controller, including configuration and latency data relating to the individual xNBs for purposes of facilitating seamless content fusion or enhancement as described in greater detail below.

In certain embodiments, the service provider network 200 also advantageously permits the aggregation and/or analysis of subscriber- or account-specific data (including inter alfa, particular CPE devices 224 associated with such subscriber or accounts) as part of the provision of services to users under the exemplary delivery models described herein. As but one example, device-specific IDs (e.g., MAC address or the like) can be cross-correlated to MSO subscriber data maintained at e.g., the network head end(s) 207 so as to permit or at least facilitate, among other things, (i) device authentication; (ii) correlation of aspects, use cases or applications to particular subscriber geographics or installation features, such as for logical grouping of CPE devices of two or more discrete subscribers (or premises thereof) for purposes of e.g., aggregation under a common "host" xNB, controller 210, or encoding server 352. Moreover, device profiles for particular CPE devices can be maintained by the MSO, such that the MSO (or its automated proxy processes) can model the subscriber-associated device for video, processing, and/or 5G wireless capabilities.

The xNB wireless access nodes 214 can be disposed at the service location(s) (e.g., areas, premises or venue(s) of interest) or more broadly, and can be coupled to the bearer managed network 200 (FIG. 2a) via, e.g., a cable modem termination system (CMTS) and associated local DOCSIS cable modem (CM) 212,2313, a wireless bearer medium (e.g., an 802.16 WiMAX or millimeter wave system —not shown), a fiber-based system such as FiOS or similar, a third-party medium which the managed network operator has access to (which may include any of the foregoing), or yet other means.

The various components of the exemplary embodiment of the network 200 generally or nominally may include (i) one or more data and application origination sources 202; (ii) one or more content sources 203, (iii) one or more application distribution servers 204; (iv) one or more video-on-demand (VOD) servers 205, (v) client devices 206, (vi) one or more routers 208, (vii) one or more wireless access node controllers 210 (may be placed more locally as shown or in the headend or "core" portion of network), (viii) one or more cable modems 212, 213, and/or (ix) one or more access nodes 214 (which may include for example 3GPP-compliant 5G NR gNodeB functionality as described elsewhere herein). The application server(s) 204, VOD servers 205 and client device(s) 206 are connected via a bearer (e.g., HFC) network 201. A simple architecture comprising one of each of certain components 202, 203, 204, 205, 208, 210 is shown in FIG. 2a for simplicity, although it will be recognized that comparable architectures with multiple origination sources, distribution servers, VOD servers, controllers, and/or client devices (as well as different network topologies) may be utilized consistent with the present disclosure.

It is also noted that cable network architecture is typically a "tree-and-branch" structure, and hence multiple tiered xNB access nodes 214 (and other components) may be linked to each other or cascaded via such structure. Notably, the architecture may also utilize MNO-managed xNBs (e.g., 5GNR gNBs, whether in SA (standalone) or NSA (non-standalone) architecture, for provision of the low-latency high stability uplink and related services described herein. While some variants of the present disclosure contemplate interaction between the 5G NR uplink components and the MSO overlay or combination encoding described below, other variants make use of a "non-aware" or nominal 5G or similar link; i.e., one which has the desired performance/ latency attributes, but which is not controlled by or involved directly in the MSO overlay or combination processing other than merely carrying the user-plane upload data.

Figure 2B:
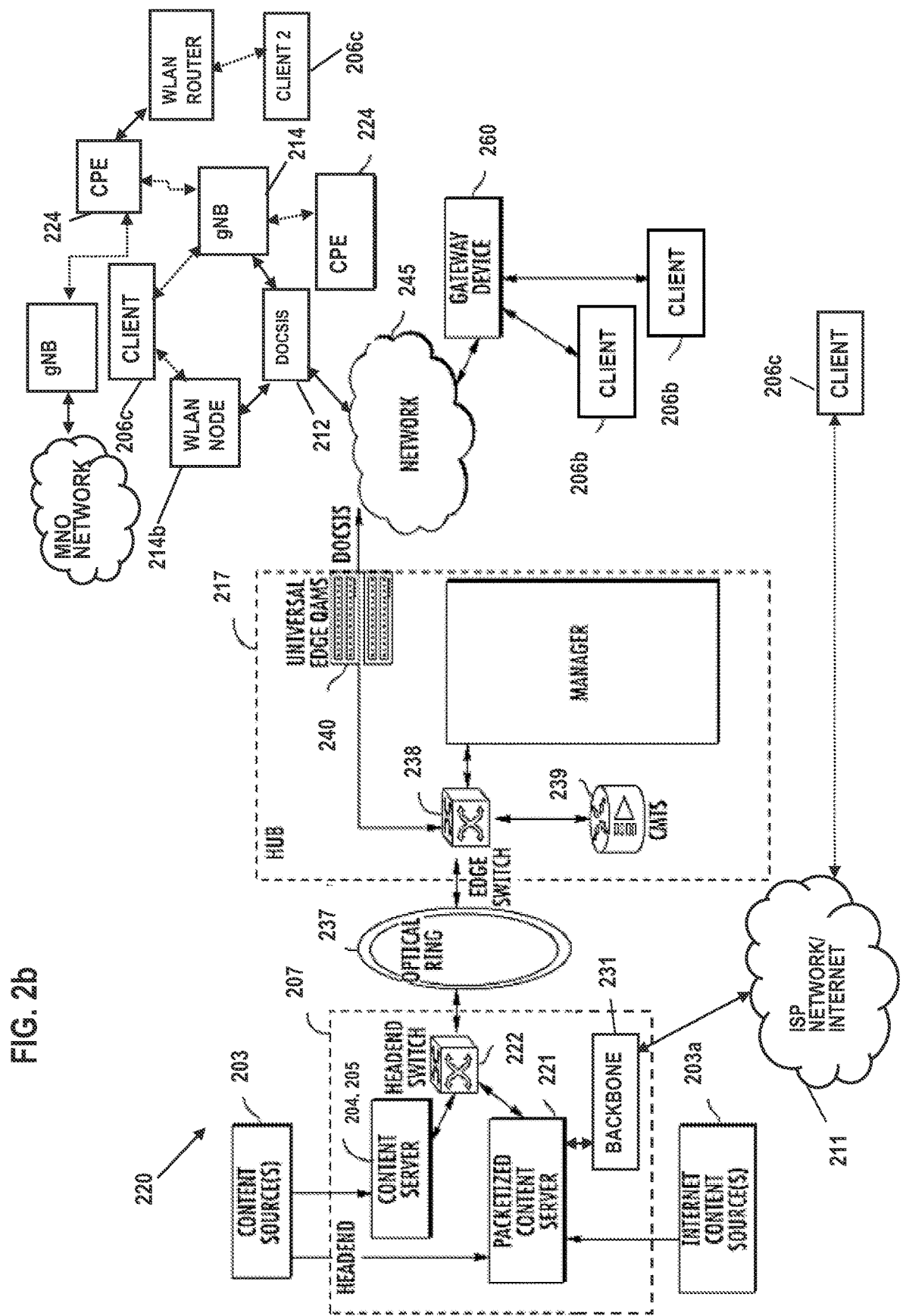
FIG. 2b is a functional block diagram of an exemplary packetized content network architecture useful in conjunction with various principles described herein.

FIG. 2b illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 2b may deliver Internet data and OTT (over-the-top) services to the end users (including those of the access nodes 214) via the Internet protocol (IP) and TCP, although other protocols and transport mechanisms of the type well known in the digital communication art may be substituted.

The network architecture 220 of FIG. 2b generally includes one or more headends 207 in communication with at least one hub 217 via an optical ring 237. The distribution hub 217 is able to provide content to various user/client devices 206, and gateway devices 260 as applicable, via an interposed network infrastructure 245. User devices such as 3GPP-compliant UE 206c (e.g., smartphones or other mobile devices) may be in direct communication with the xNB (whether MSO or MNO managed) as shown.

Various content sources 203, 203a are used to provide content to content servers 204, 205 and origin servers 221. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 203a (such as e.g., a web server) provide Internet content to a packetized content origin server(s) 221. Other IP content may also be received at the origin server(s) 221, such as voice over IP (VoIP) and/or IPTV content. Content may also be received from subscriber and non-subscriber devices (e.g., a PC or smartphone-originated user made video) and included on the downlink to a given CPE (as well as that CPE or an associated device originating similar content itself, as described elsewhere herein).

The centralized media server(s) 221, 204 located in the headend 207 may also be replaced with or used in tandem with (e.g., as a backup) to hub media servers (not shown) in one alternative configuration. By distributing the servers to the hub stations 217, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 221, 204 may either be single-purpose/dedicated (e.g., where a given server is dedicated only to servicing certain types of requests), or alternatively multipurpose (e.g., where a given server is capable of servicing requests from different sources).

The network architecture 220 of FIG. 2b may further include a legacy multiplexer/encrypter/modulator (MEM; not shown). In the present context, the content server 204 and packetized content server 221 may be coupled via a LAN to a headend switching device 222 such as an 802.3z Gigabit Ethernet (or "10G/10GbE") device. For downstream delivery via the MSO infrastructure (i.e., QAMs), video and audio content is multiplexed at the headend 207 and transmitted to the edge switch device 238 (which may also comprise an 802.3z Gigabit Ethernet device) via the optical ring 237.

In one exemplary content delivery paradigm, MPEG-based video content (e.g., MPEG-2, H.264/AVC) may be delivered to user IP-based client devices over the relevant physical transport (e.g., DOCSIS or other channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 212 (including to end users of the xNB access node 214 and CPE 224). Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems 212 and associated end-user devices 206a, 206b of the implementation of FIG. 2b may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 239. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 212 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 240. According to this embodiment, all of the content is delivered on DOCSIS channels, which are received by a premises gateway 260 or cable modem 212, and distributed to one or more respective client devices/UEs 206a, 206b, 206c in communication therewith.

In one implementation, the CM 212 shown in FIG. 2b services an area which may include a prescribed premises or venue, such as an apartment building, conference center or hospitality structure (e.g., hotel). In parallel (or in the alternative), the premises includes one or more CPE nodes 224, and a WLAN (e.g., Wi-Fi) node 214b for WLAN access (e.g., within 2.4 GHz ISM band), or a 3GPP "small cell" gNB. The CPE 224 may also provide connectivity for a WLAN router as shown (i.e., the CPE acting as a network interface for attached router which provides localized WLAN services to portions of the premises), which provides e.g., Wi-Fi access for users at the premises. The CPE 224 may also communicate wirelessly with non-MSO xNB devices operated by e.g., an MNO for backhaul via that MNO's infrastructure, as shown at the top of FIG. 2b. Notably, in some configurations, the client devices 206c communicating with the access nodes 214a, 214b, as described in greater detail subsequently herein, can utilize either RAT (3GPP with the xNB or WLAN). In one variant, this selective utilization may depend on, inter alfa, directives received from the MSO controller 210 (FIG. 2a) via one access node 214 or the other, or even indigenous logic on the client device 206c enabling it to selectively access one RAT or the other, such as where the stringent latency and performance characteristics of the 5G NR RAT are not needed for a particular encoding or combination operation, or where WLAN has sufficient performance. Feasibly, both RATs could operate in tandem, since they utilize different frequencies, modulation techniques, interference mitigation techniques, Tx power, etc.

In parallel with (or in place of) the foregoing delivery mechanisms, the MSO backbone 231 and other network components can be used to deliver packetized content to the user's mobile client device 206c via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 211 (e.g., at a local coffee shop, via a Wi-Fi AP connected to the coffee shop's ISP via a modem, with the user's IP-enabled end-user device 206c utilizing an Internet browser or MSO/third-party app to stream content according to an HTTP-based approach).

5G New Radio (NR) and NG-RAN (Next Generation Radio Area Network)—

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, exemplary Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alfa, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

Figure 2C:
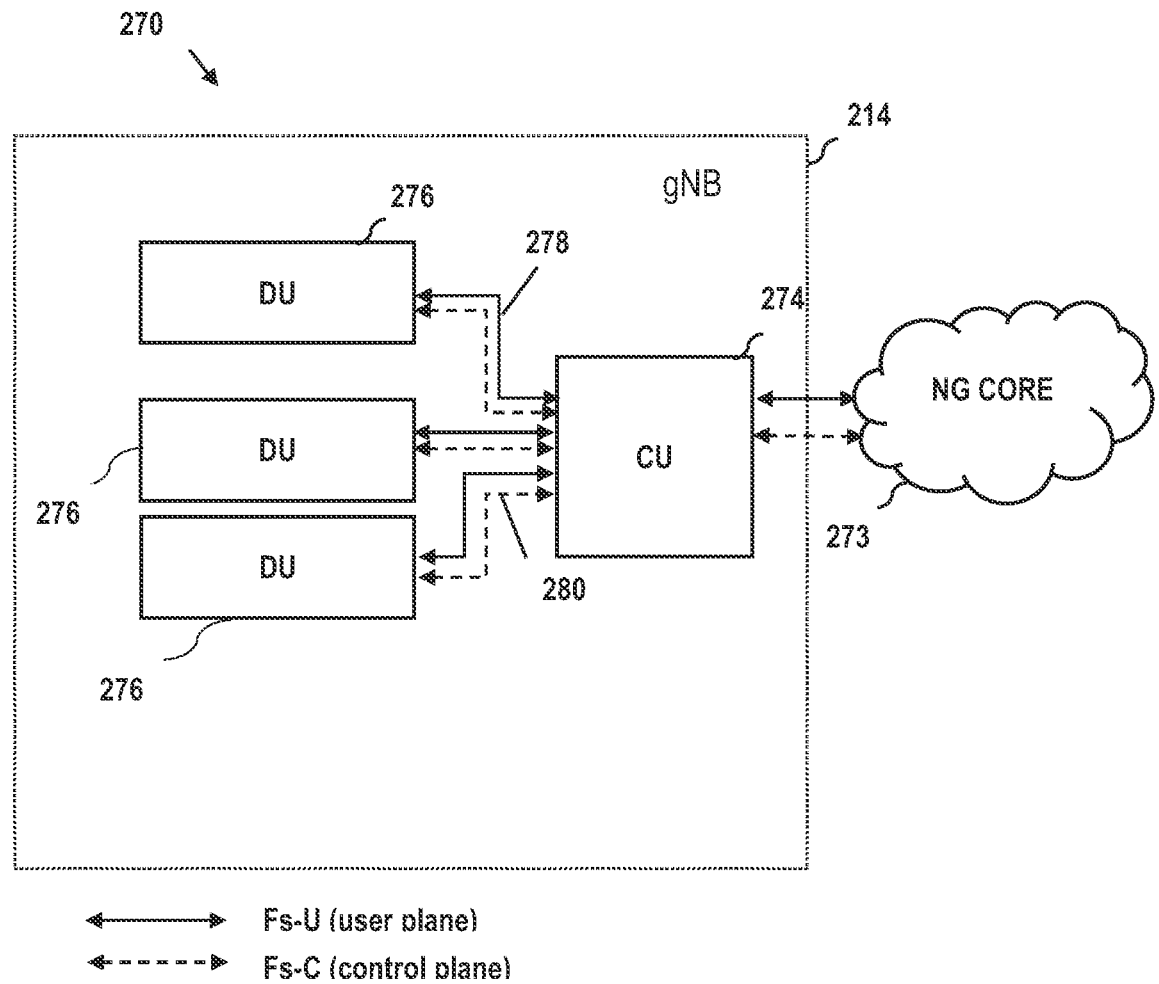
FIG. 2c is a functional block diagram of a gNB architecture including CU and multiple DUs.

As a brief aside, and referring to FIG. 2c, the CU 204 (also known as gNB-CU) is a logical node within the NR architecture 270 that communicates with the NG Core 273, and includes gNB functions such as transfer of user data, session management, mobility control, RAN sharing, and positioning; however, other functions are allocated exclusively to the DU(s) 276 (also known as gNB-DUs) per various "split" options described subsequently herein in greater detail. The CU 274 communicates user data and controls the operation of the DU(s) 276, via corresponding front-haul (Fs) user plane and control plane interfaces 278, 280.

Accordingly, to implement the Fs interfaces 278, 280, the (standardized) F1 interface is employed. It provides a mechanism for interconnecting a gNB-CU 3204 and a gNB-DU 276 of a gNB 214 within an NG-RAN, or for interconnecting a gNB-CU and a gNB-DU of an en-gNB within an E-UTRAN. The F1 Application Protocol (F1AP) supports the functions of F1 interface by signaling procedures defined in 3GPP TS 38.473.

Within such an architecture 270, a gNB-DU 276 (or ngeNB-DU) is under the control of a single gNB-CU 274. When a gNB-DU is initiated (including power-up), it executes the F1 SETUP procedure (which is generally modeled after the above-referenced S1 SETUP procedures of LTE) to inform the controlling gNB-CU of, inter alfa, any number of parameters such as e.g., the number of cells (together with the identity of each particular cell) in the F1 SETUP REQUEST message.

Co-owned and co-pending U.S. patent application Ser. No. 16/216,835 filed Dec. 11, 2018 and entitled "Apparatus and Methods for Integrated High-Capacity Data and Wireless Network Services", incorporated herein by reference in its entirety, describes exemplary network architectures that can be used in accordance with the present disclosure. For example, in one embodiment, a network architecture having service delivery over at least portions of extant infrastructure (e.g., a hybrid fiber coax infrastructure) is disclosed, which includes standards-compliant ultra-low latency and high data rate services (e.g., 5G NR services) via a common service provider. However, it will be recognized by those of ordinary skill that other approaches and architectures may be substituted.

Exemplary Enriched Content/Video Streams (EVS) Distribution Architecture—

Figure 3:
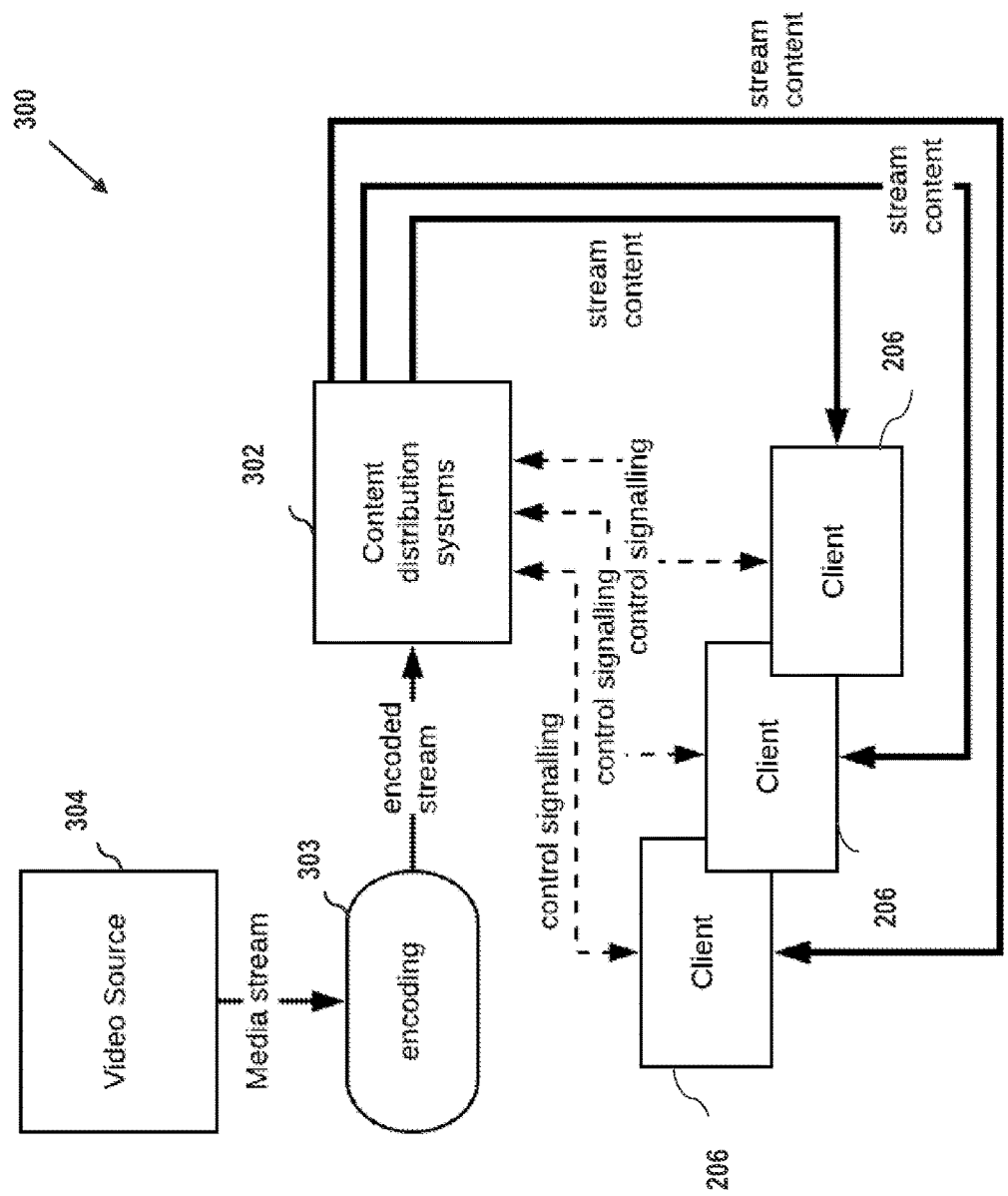
FIG. 3 is a simplified functional block diagram of a typical prior art content encoding and distribution architecture.
Figure 3A:
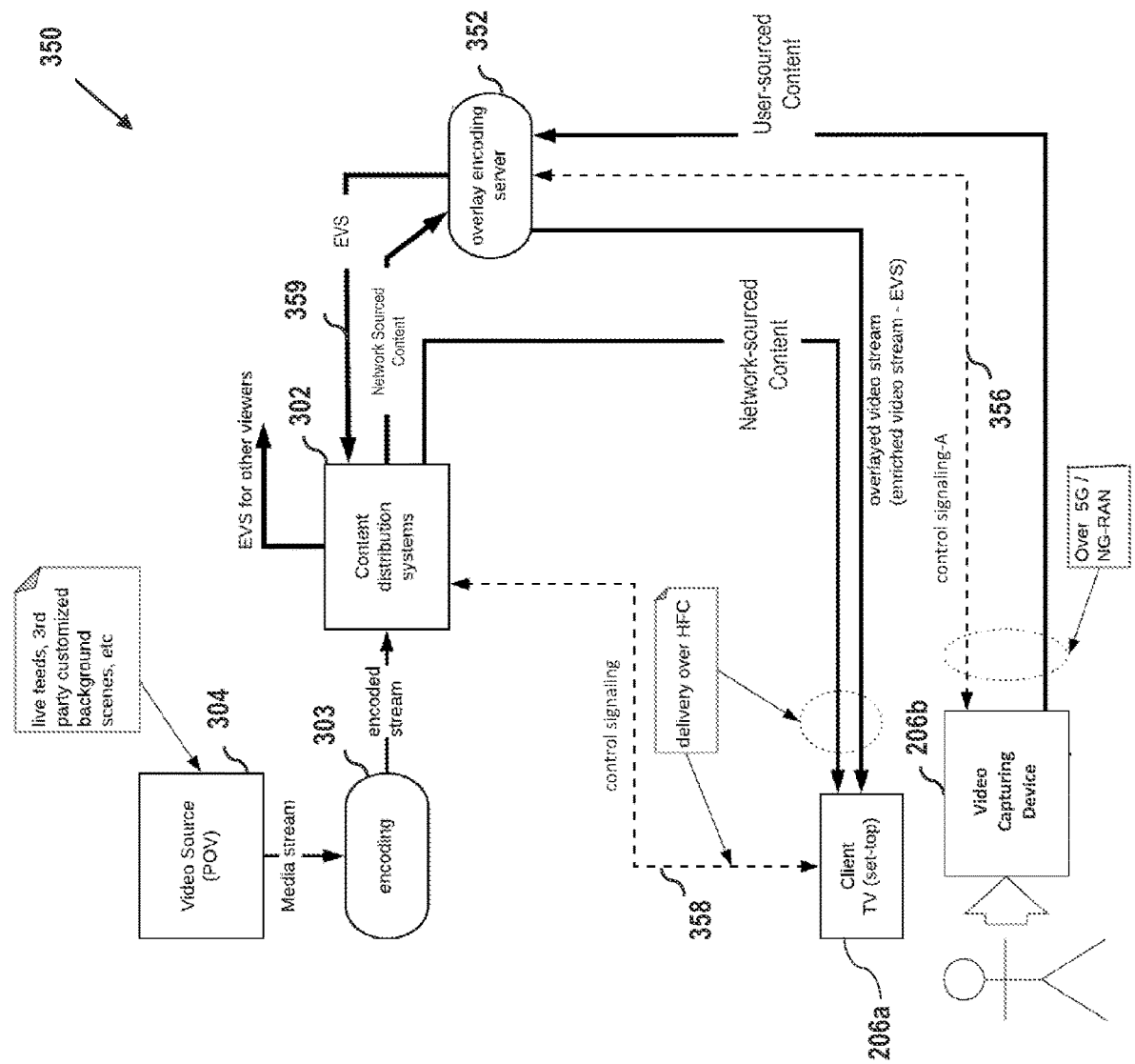
FIG. 3A is a functional block diagram of an exemplary embodiment of an enriched content stream distribution architecture, according to the present disclosure.

Referring now to FIGS. 3 and 3a, an exemplary embodiment of a content distribution architecture 350 adapted for enriching or combining content elements according to the present disclosure is described in detail.

It is noted that the apparatus, systems and methods described below are useful in providing storage and access to user-initiated content, as well as in providing storage and access to MSO-initiated content, whether provided individually or in combination (e.g., via the synchronization process(es) described herein). Storage and access of MSO-initiated content according to the present disclosure enables, inter alfa, a high degree of QoE, redundancy, and security. It further enables a user to access content simultaneous to the content's broadcast, and to start the program over from the beginning after it has begun without the user having previously recorded the content (e.g., "start-over" functionality).

FIG. 3 shows a typical prior art encoding and delivery architecture 300. As shown, this architecture 300 generally comprises one or more content distribution systems 302 that is/are in data communication with one or more client devices (or premises, such as households or enterprises) 206.

The client devices 206 may include DSTBs, home gateway devices and/or media client devices.

As shown, the architecture 300 of FIG. 3 also includes at least one content source 304 providing content to the CDN 302. Various third party and/or internal (i.e., MSO owned or operated) content sources 304 may provide content to the CDN 302. For example, content may be received from a local, regional, or network content library. Alternatively, content may be received from linear analog or digital feeds, as well as various third party content sources.

In some cases, one or more encoder processes 303 encodes a source file from the content source(s) 304 into at least one encoding format (e.g., transcodes a source file from one format to at least one other format). The variety of encodings may be utilized by the CDN cache (and the packager) via adaptive bitrate (ABR) streaming.

As a brief aside, digital encoding utilizes one or more forms of video compression in order to economize on storage space and transmission bandwidth. Without such video compression, digital video content can require extremely large amounts of data storage capacity, making it difficult or even impossible for the digital video content to be efficiently stored, transmitted, or viewed.

Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards. The MPEG-4 Advanced Video Coding (AVC) standard (also known as MPEG-4, Part 10) is a newer standard jointly developed by the International Organization for Standardization (ISO) and ITU-T. The MPEG-4 AVC standard is published as ITU-T H.264 and ISO/IEC 14496-10. For purposes of clarity, MPEG-4 AVC is referred to herein as H.264.

As noted above, content often arrives from content sources at a content distribution network (CDN) in a digitally encoded format, such as MPEG-2. The MPEG-2 standard is ubiquitous and specifies, inter alfa, methodologies for video and audio data compression and encoding. Specifically, in accordance with the MPEG-2 standard, video data is compressed based on a sequence of GOPs, made up of three types of picture frames: coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame. The GOP may represent additional frames by providing a much smaller block of digital data that indicates how small portions of the I-frame, referred to as macroblocks, move over time.

MPEG-2 achieves its compression by assuming that only small portions of an image change over time, making the representation of these additional frames compact. Although GOPs have no relationship between themselves, the frames within a GOP have a specific relationship which builds off the initial I-frame.

In a traditional content delivery scheme (e.g., for a cable network), the compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams, which utilize MPEG-2 encoded video content as their payload.

However, despite its ubiquity, MPEG-2 has salient limitations, especially relating to transmission bandwidth and storage. The more recently developed H.264 video coding standard is able to compress video much more efficiently than earlier video coding standards, including MPEG-2. H.264 is also known as MPEG-4 Part 10 and Advanced Video Coding (AVC). H.264 exhibits a combination of new techniques and increased degrees of freedom in using existing techniques. Among the new techniques defined in H.264 are 4×4 discrete cosine transform (DCT), multi-frame prediction, context adaptive variable length coding (CAVLC), SI/SP frames, and context-adaptive binary arithmetic coding (CABAC). The increased degrees of freedom come about by allowing multiple reference frames for prediction and greater macroblock flexibility. These features add to the coding efficiency (at the cost of increased encoding and decoding complexity in terms of logic, memory, and number of operations). Notably, the same content encoded within H.264 can be transmitted with only roughly half (50%) of the requisite bandwidth of a corresponding MPEG-2 encoding, thereby providing great economies in terms of CDN infrastructure and content storage.

Digital encoding also advantageously lends itself to transcoding of content. As used herein, the term "transcoding" refers generally to the process of changing content from one encoding to another. This may be accomplished for example by decoding the encoded content, and then re-encoding this into the target format. Transcoding can also accomplish the encoding of content to a lower bitrate without changing video formats, a process that is known as transrating.

Transcoding is used in many areas of content adaptation; however, it is commonly employed in the area of mobile devices such as smartphones, tablets, and the like. In such mobile applications, transcoding is essential due to the diversity of mobile devices. This diversity effectively requires an intermediate state of content adaptation, so as to ensure that the source content will adequately present or "render" on the target mobile device.

Delivery of encoded content may also utilize a technology known as "adaptive bitrate streaming." Adaptive bitrate (ABR) streaming is a technique to distribute program content over a large distributed network in an efficient manner based on, inter alia, available streaming capacity. In one implementation, multiple bitrates of a particular piece of content are available to stream to a viewer, and the selection of the bitrate is based on current network conditions. This means that when there is greater bandwidth availability, a larger bitrate version of the content may be selected. If available bandwidth narrows, a lower bitrate (i.e., smaller) version of the content may be selected to provide a seamless user experience. Typical ABR streaming solutions include e.g., DASH (dynamic adaptive streaming over HTTP), Microsoft Smooth Streaming, and Adobe HTTP Dynamic Streaming, which are further particularly adapted for HTTP-based environments such as Internet delivery. ABR streaming protocols are typically codec-agnostic (e.g., may use content encoded in e.g., H.264, MPEG-2, or others), and are notably distinguishable from such underlying encoding.

Existing DOCSIS Operation—

As a brief aside, a brief examination of existing DOCSIS operations may be helpful in understanding of various aspects of the present disclosure. Existing DOCSIS operation is provided with the aforementioned Cable Modem Termination System (CMTS) which is connected to the broader Internet. The CMTS includes a number of servers which run the Dynamic Host Configuration Protocol (DHCP) protocol, a Trivial File Transfer Protocol (TFTP), and a Time of Day (TOD) server. The CMTS communicates with each subscriber's cable modem via the HFC network (which includes miles of coaxial cable, fiber optics, amplifiers, etc.). The CMTS provides a synchronization broadcast ("sync"), Uplink Channel Descriptor (UCD), and Media Access Protocol (MAP) messages. Both the UCD and sync broadcasts are periodically transmitted.

To establish a physical connection, a cable modem searches for and identifies the sync broadcast to determine its time alignment, decodes the current UCD to determine, inter alfa, an appropriate uplink frequency, symbol rate, modulation profile, etc. Once a cable modem has achieved time synchronization and decoded the uplink parameters, it performs a ranging process by transmitting range requests (RANGE_REQ). If the CMTS responds to a RANGE_REQ with a range response (RANGE_RSP), then the cable modem and CMTS can transition to a station maintenance state and perform additional detailed connection maintenance. If the CMTS does not provide a RANGE_RSP, the cable modem will increase its transmit power and attempt access again.

Once an active connection is available, the cable modem can perform IP layer initialization procedures. The population of cable modems time share the uplink frequency(ies) according to a TDMA (time division multiple access) scheme, thus before transmitting, each cable modem must request an allocation of transmit bandwidth from the CMTS by transmitting a bandwidth request (REQUEST). The CMTS prioritizes requests within an internal queue, and allocates resources with the aforementioned MAP message which includes, inter alfa, an allocated transmit time slot for the cable modem. After the cable modem has been allocated a transmit time slot, it attempts to locate a DHCP server which can provide an IP address and other network information (e.g., gateway addresses, network addresses, etc.) which are required for registration. Specifically, the cable modem will request and receive a time of day message from the TOD server, and a configuration file from the TFTP server.

After the IP layer initialization procedure, the cable modem must register with the CMTS. The registration process ensures that the cable modem has the proper configuration file and timing to operate with the existing network. If the registration process is successful, the cable modem is provided with a Service Identifier (SID), and is transitioned into an "online" state.

During online operation, the cable modem and CMTS perform medium access control (MAC) based on the SID. The IP layer operates transparently over the SID based MAC communication. For example, when a cable modem has data for transmission, it transmits a REQUEST to the CMTS. As previously alluded to, the CMTS prioritizes each REQUEST and allocates a number of time slots for each SID (each SID corresponds to a cable mode). These allocations are broadcast via MAP messages, which identify an applicable SID, the assigned time slot(s), and the number of bytes. Additionally, the CMTS periodically provides an Interval Usage Code (IUC) within the UCD which identifies a series of so called "burst-profiles". Each burst profile identifies an appropriate modulation scheme (e.g., QPSK, 16-QAM, 64-QAM, etc.) for a type of traffic. For example, IP traffic can be set to 64-QAM which provides high data rates, whereas VOIP traffic can be set to 16-QAM which provides more robust but lower data rates.

In a typical coaxial cable system (e.g., HFC), downlink bandwidth is much higher than uplink bandwidth. Specifically, cable modem or DOCSIS-compliant systems utilize DOCSIS QAMs (RF channels) for enhanced upstream bandwidth capability such as for Internet services, but such technologies are significantly limited in capability, and moreover have limited flexibility in the allocation of downstream versus upstream bandwidth, especially dynamically. For example (as discussed supra), a typical uplink speed is about 5 Mbps while the downlink speed can be up to 100 Mbps. The uplink latency can be in the range of 20-50 ms.

Hence, utilization of DOC SIS channels for uplink of data may encounter significant degrees of unpredictability and latency which make its use in the context of highly synchronized encodings unsuitable. Similarly, downlink of data via e.g., DOC SIS may also encounter some degree of latency, but this is generally more predictable in nature. For instance, DL traffic scheduling is performed by the CMTS directly, unlike the UL case where the client's cable modem needs to negotiate with the CMTS for UL bandwidth (e.g., send a REQUEST to the CMTS first, then wait for the "grant" from CMTS). As such, these negotiations may be unpredictable in terms of, inter alfa, their temporal aspects and hence latency associated with UL transmission of data.

Referring now to FIG. 3a, an exemplary embodiment of an enriched content/video streams (EVS) distribution architecture 350 according to the present disclosure is described in detail. Similar to the architecture 300 of FIG. 3, the architecture 350 of FIG. 3a can include content distribution systems or CDN 302, one or more encoding processes 303, and content source(s) 304.

As a brief aside, in contrast to the comparatively high degree of latency and instability which may be encountered on certain extant uplink technologies such as DOCSIS (discussed above), 5G NR technology has both ultra-low latency requirements (i.e., 1 ms or less round-trip between endpoint nodes) on UL and DL, and much greater inherent stability. However, with respect to overlaying networking programming or live event with user content uploaded using 5G, infrastructure-induced latency associated with the networking programming or live event being combined with the user upload must be accounted for. Accordingly, in order for a server to synchronize two different media streams— e.g., (i) network programming received over traditional coaxial infrastructure (e.g., "in band" and DOCSIS (and OOB) transport), and (ii) personal content (e.g., user-generated content) received over an IP connection using 5G NR—such that the different content is overlaid at the correct time sequence, the present disclosure provides a solution to overcome inter alfa, the uplink bandwidth and latency issue with respect to DOC SIS.

Referring again to FIG. 3a, in one exemplary embodiment of the improved architecture, the content source(s) 304 include a video source which provides video content to the CDN 302. The video content may be received from linear analog or digital feeds, as well as various third party content sources; for example, the content can include live feeds, third party customized background scenes, and the like.

As noted above, content can undergo one or more encoding processes 303 before it arrives at a content distribution network (CDN) 302 from the content source(s) 304. For example, the content may arrive at CDN 302 in a digitally encoded format, such as MPEG-4. The MPEG-4 standard is ubiquitous and specifies, inter alfa, methodologies for video and audio data compression and encoding, and is able to compress video much more efficiently than earlier video coding standards, including MPEG-2.

The present disclosure contemplates a served premises (e.g., household, enterprise, venue, or person(s)) having two or more client devices associated therewith or users thereof, and therefore may have access to two or more independent communications paths to the content being distributed (e.g., see the architectures of FIGS. 2a and 2b discussed above). As but one example, in the exemplary configuration of the architecture 350 of FIG. 3a, a user may have access to CPE 206a (e.g., a DSTB, home gateway devices and/or media client devices, such as Smart TV or the like), which may have wired or wireless connection (e.g., connected to a HFC/DOCSIS cable modem via a wireless communications network such as a wireless LAN (e.g., Wi-Fi)). Additionally, as shown in FIG. 3a, a user may have access to client device 206b, which in various embodiments, includes a 5G-capable media capture device 206b (e.g., a smartphone, tablet, or the like) which interfaces with a 5G service provider network (such as architecture of FIGS. 2a and 2b).

In some embodiments, the 5G network can be in data communication with the Internet (or directly to the distribution network 202. That is, the architecture 350 of FIG. 3a may deliver Internet data and OTT (over-the-top) services to the end users via the Internet protocol (IP) and TCP (i.e., over the 5G radio bearer), as well as receive upload content from end users via the Internet protocol (IP) and TCP (i.e., over the 5G radio bearer). However, other protocols and transport mechanisms of the type well known in the digital communication art may be substituted.

Additionally, the exemplary configuration of the architecture 350 includes an overlay encoding server (OES) apparatus 352. The overlay encoding server 352 is configured to receive both (i) network content (e.g., VOD, broadcast, live, etc.) from the CDN 302, and (ii) user content from subscriber and/or non-subscriber devices 206b (e.g., a PC or smartphone-originated user made video which is uploaded, such as to an Internet or MSO-operated social media portal, utilizing 5G NR). The overlay encoding server 352 is further configured to create a composite content stream including both the user content uploaded from the client device 206b and the network content received from CDN 302. When the time references of user content and the network content are synchronized in the composite content stream, the synchronized composite content stream is herein referred to as an "enriched video stream" (EVS). It will be appreciated that while a two-element EVS is described in the various exemplary embodiments (for sake of simplicity), the present disclosure contemplates EVS comprising three or more discrete or separately sourced content elements (e.g., Network Content+User 1 upload content . . . +User n upload content, or Network Content 1+Network Content 2+User upload content 1).

It will also be appreciated that the various constituent components of the EVS may be temporally intermixed, such as where during a first period, the constituent components include a different "mix" than during a second period, and so forth. For example, it may be germane to have User 1's uploaded content combined with the network sourced content during a first portion or logical segment thereof (e.g., an act, scene, event, etc.), while that of User 2 is more relevant to another portion.

As user-generated content is to be combined with other programming (e.g., one or more other channels), in some embodiments, routing information may be provided to the OES 352. The routing information may specify the source of the programming content to be combined. In some variants, the routing information may be an IP address of the HFC network entity (e.g., a content server), however it is further appreciated that routing information may require significant amounts of network address translation (for e.g., security reasons, the CPE generally would not have access to the address of a CDN or origin server, etc.).

Additionally, the OES 352 utilizes control signaling to synchronize the composite stream. For example, in various embodiments, the overlay encoding server 352 can create an unsynchronized composite content stream—i.e., the time reference between the network sourced content and the user content is not synchronized—and transmit the unsynchronized composite content stream components to the rendering device e.g., STB/TV 206b. The rendering device 206b or user thereof (depending on the various manual or automated variants described subsequently herein) can then determine the delay between the network sourced content and the user content, and provide signaling information (via for instance the control signaling-A channel 356 shown in FIG. 3a) to the OES 352.

In one exemplary embodiment, the protocol used to signal the time synchronization delay to the OES 352 over control signaling-A channel 356 in FIG. 3a includes that described in IETF RFC 3611 ("RTP Control Protocol (RTCP) Extended Report (XR)—Blocks for Synchronization Delay and Offset Metrics Reporting"), which is incorporated by reference herein in its entirety, although it will be recognized that other protocols (and transports) may be used for such signaling. For example, as disclosed in RFC 3611, RTP multimedia sessions or one RTP session can be an arbitrary number of media streams, and each media stream (e.g., audio stream or video stream) is sent in a separate RTP stream. For one RTP session, each media stream/medium uses a different SSRC. The RTCP CNAME contained in the RTCP Source Description (SDES) packets [see RFC3550] is used to correlate the various streams. As such, the synchronization offset of e.g., two arbitrary RTP streams that are to be synchronized within a multimedia session can be specified and transmitted to desired entities.

Moreover, RFC 3611 also describes that data about the relative average time difference between two arbitrary RTP streams (the reporting stream and the reference stream) with the same CNAME may be recorded, and the receiver of the RTP stream can use this data. Mechanisms by which offset of the reporting stream relative to the reference stream are also described (e.g., the block for the reference stream with synchronization offset of zero can be reported).

Utilizing the signaling information, the OES 352 can adjust the timing discrepancy between the respective frames of the network-sourced content and the user content (either by temporally advancing or delaying respective frames) to synchronize the frames and create the EVS. Moreover, in various implementations, the OES 352 can transmit the EVS to the content distribution system 302 (e.g., via a transport or medium 359, which may include for instance a PCIe, 10 GbE, millimeter wave, or other interface between the systems, depending on configuration and location of each) for other viewers to consume (e.g., via social media such as YouTube, Twitch, etc.), or to the requesting user (via any one of client devices 206) for reviewing the EVS.

As shown in FIG. 3a, the exemplary client 206a also includes a control signaling channel 358 between the client and the CDN 302 for, inter alia, control of content distribution functions to the client 206a. For example, in one scenario, extant channels and protocols used for other purposes such as VOD/StartOver functionality, tuner data exchange, EPG acquisition or other can be concurrently used or repurposed to support the above-described functions.

Referring back to FIG. 2c, communication with the CPE 206 supplying the upload may be established via e.g., the MSO infrastructure (e.g., in-band or DOCSIS or WLAN channels), such that for example control signaling (e.g., control plane data and commands) can be passed to that CPE, which in some implementations, enable rapid 5G NR session establishment and teardown between the CPE and its associated gNB. In such implementations, the content distribution network (CDN) 202 may also send control data to the gNB CU (see FIG. 2c) or other edge node responsible for establishing a session between the uploading CPE and the gNB. Hence, the CDN may be used to instigate the overlay encoding session establishment (including getting the uploading CPE to connect to the 5G gNB if not already in such connected state (e.g., RRC Connected), in effect acting as the master of the content fusion/combination process.

Methods—

Figure 4:
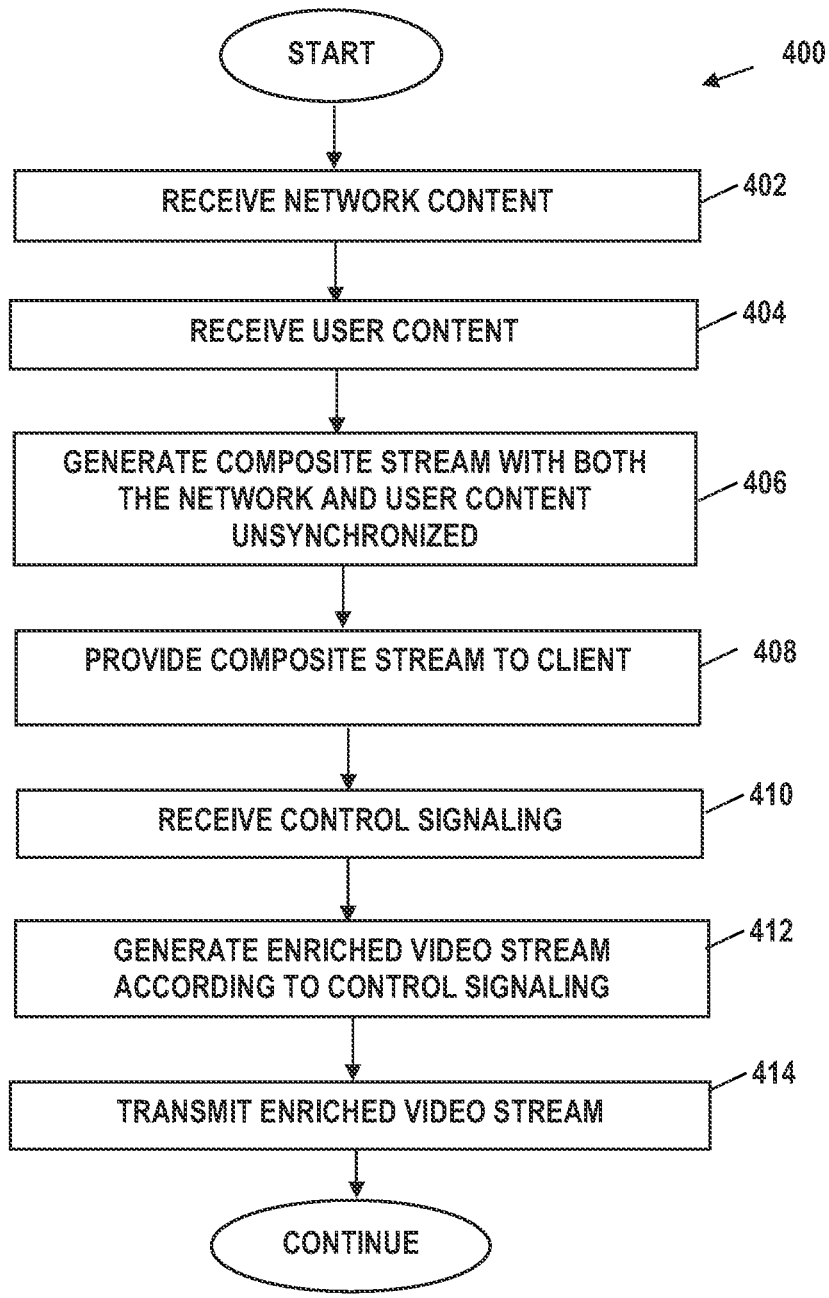
FIG. 4 is a logical flow diagram illustrating one exemplary embodiment of a method for synchronizing two different content streams within e.g., the architectures 300, 350 of FIGS. 3 and 3A, respectively, according to the present disclosure.

Referring now to FIG. 4, one exemplary embodiment of a method 400 for synchronizing two or more different content streams in accordance with the present disclosure is provided. Although the steps of method 400 are at least substantially performed by the overlay encoding server (OES) (corresponding to reference numeral 352 in FIG. 3a), in practical embodiments, some of these steps (or sub-steps within each step) may be implemented in parallel, on different hardware platforms or software environments, performed iteratively, deleted, and so forth.

In the first step 402 of the method 400, network-sourced content is received. In some embodiments, the network content is received at the OES 352 from the CDN 302. As alluded to above, method 400 is at least substantially directed to operation of the OES. However, as shown in FIG. 3a, both the client device 206a (e.g., a TV set-top box (STB)) and the OES 352 are configured to receive the network content. The CPE 206a can render and display the network content for a user to watch. Additionally, the CPE 206a may receive control signaling which enables it to receive the network content from the CDN 302, for example, by tuning to the certain RF QAM indicted by the control signaling.

In various embodiments, the network programming can include broadcast video and audio programming, a live program delivered by the broadcast television network, Video on Demand (VOD) content, DVR, linear broadcasts, start-over content, IPTV content, third party customized background scenes, gaming content, etc.

At step 404, the user content is received. In one exemplary embodiment, the user content is uploaded to the OES 352 from the client device (e.g., client device 206b in FIG. 3A). In various implementations, the user content may be received from subscriber and/or non-subscriber devices. In some embodiments, the client device 206b may be a video capture device (e.g., a smartphone with a camera), such that the user records content thereby. For example, a PC or smartphone-originated user made video may be uploaded to the OES 352, in some variants, via an Internet or MSO-operated social media portal.

As previously described, the present disclosure in one embodiment leverages 5G NR for uploading the user content in order to provide a stable bit pipe with expected (predictable) available bandwidth and latency. Accordingly, the client device may be a 5G-enabled client device that establishes a wireless Internet-Protocol (IP) connection to the OES 352 using a 3GPP 5G NR backhaul. However, other protocols and transport mechanisms with suitable performance (e.g., low/predictable latency and bandwidth availability) may be substituted.

At step 406, a composite content stream including both the user content and the network content is generated. In some embodiments, the OES 352 generates the composite content stream by injecting the user content into the packetized stream carrying the network content. In some variants, the user content may be super-imposed or overlaid over the network content. For example, the user content may be disposed within a PIP (picture-in-picture) window within the network content. Multiple content elements can also be "stacked" in windows overlaid onto one another, including in one variant utilizing display element control schemes such as those described in U.S. Pat. No. 9,213,538 to Ladd, et al. issued Dec. 15, 2015 and entitled "Methods and apparatus for display element management in an information network," which is incorporated herein by reference in its entirety.

In other variants, the user content and the network content can be configured in the composite stream to be displayed side-by-side or top-over-bottom or other such composite. In yet other variants, frames of the user content may be marked for insertion into the network-sourced content, such as via interleaving. Additionally, it is noted that, at this phase, the time reference between the network-sourced content and the user content is not temporally synchronized, and as such, in one embodiment, there is a simple overlay of one content element or stream onto the other.

In one particular exemplary embodiment, the OES 352 generates the composite stream by multiplexing two different unicast streams. For example, the OES 352 may receive two single program transport streams (SPTSs) including the network content and the user content respectively. The network and user content is then switched into delivery on available QAM dedicated to the multicast delivery of IP packetized content and delivered via a multi-program transport stream (MPTS). A gateway entity in data commination with the CPE 206a joins the multicast and receives the MPTS, the contents of which are processed and delivered to the CPE 206a.

At step 408, the composite content stream with the unsynchronized network and user content is transmitted to the client device. In various exemplary embodiments, the composite stream is transmitted to the rendering device (e.g., TV/STB) 206a to be displayed to the user. The user can then watch the composite video stream on TV/STB 206a, and use the control signaling-A (see FIG. 3a) on the video capturing device 206b to indicate to the OES 352 whether to advance or delay the user content with respect to the network content in order to create the enriched video stream (EVS) with proper time framing for both video streams.

Figure 5:
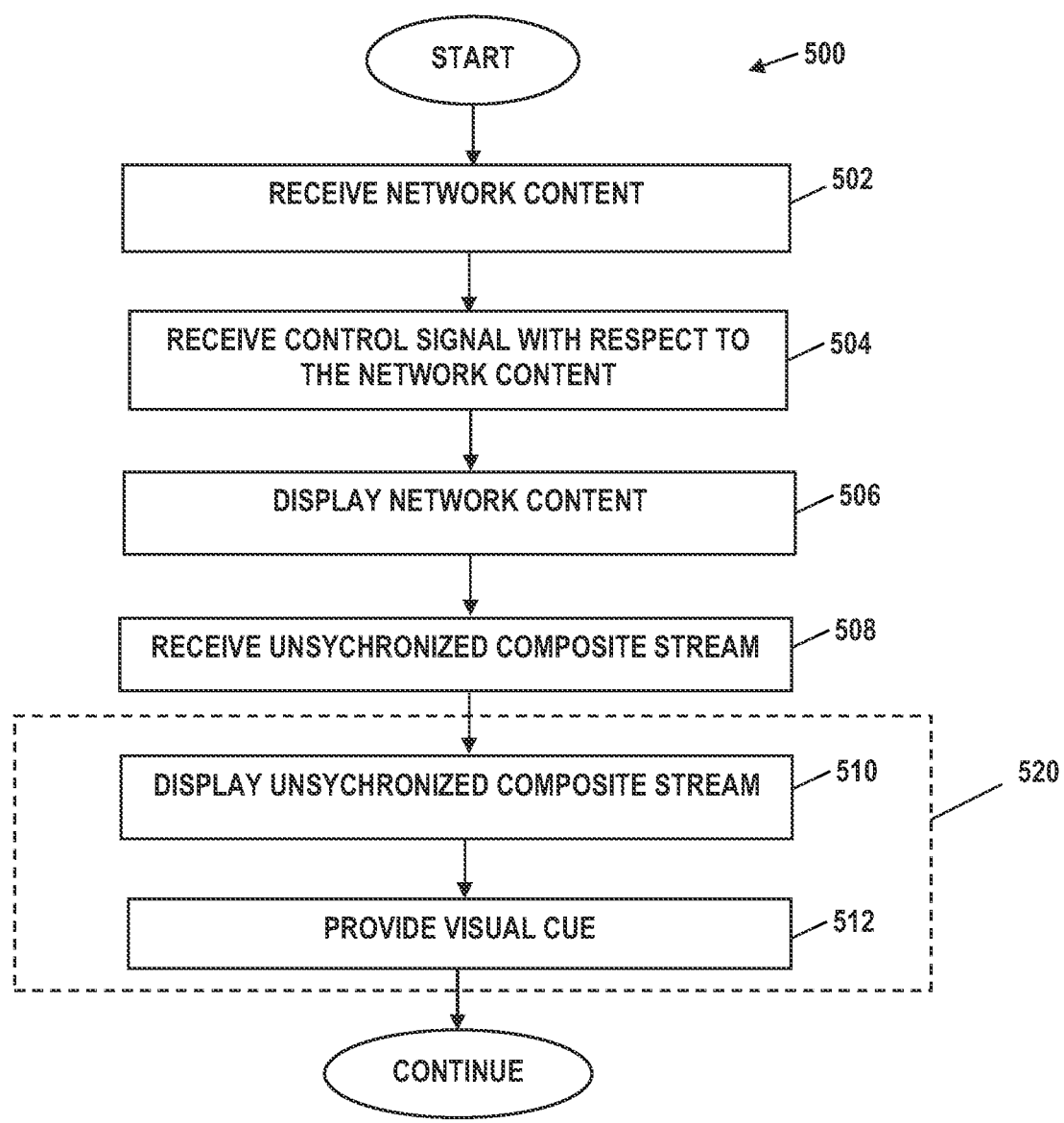
FIG. 5 is a logical flow diagram illustrating one exemplary embodiment of a method for synchronizing two different content streams via a manual adjustment process, according to the present disclosure.
Figure 6:
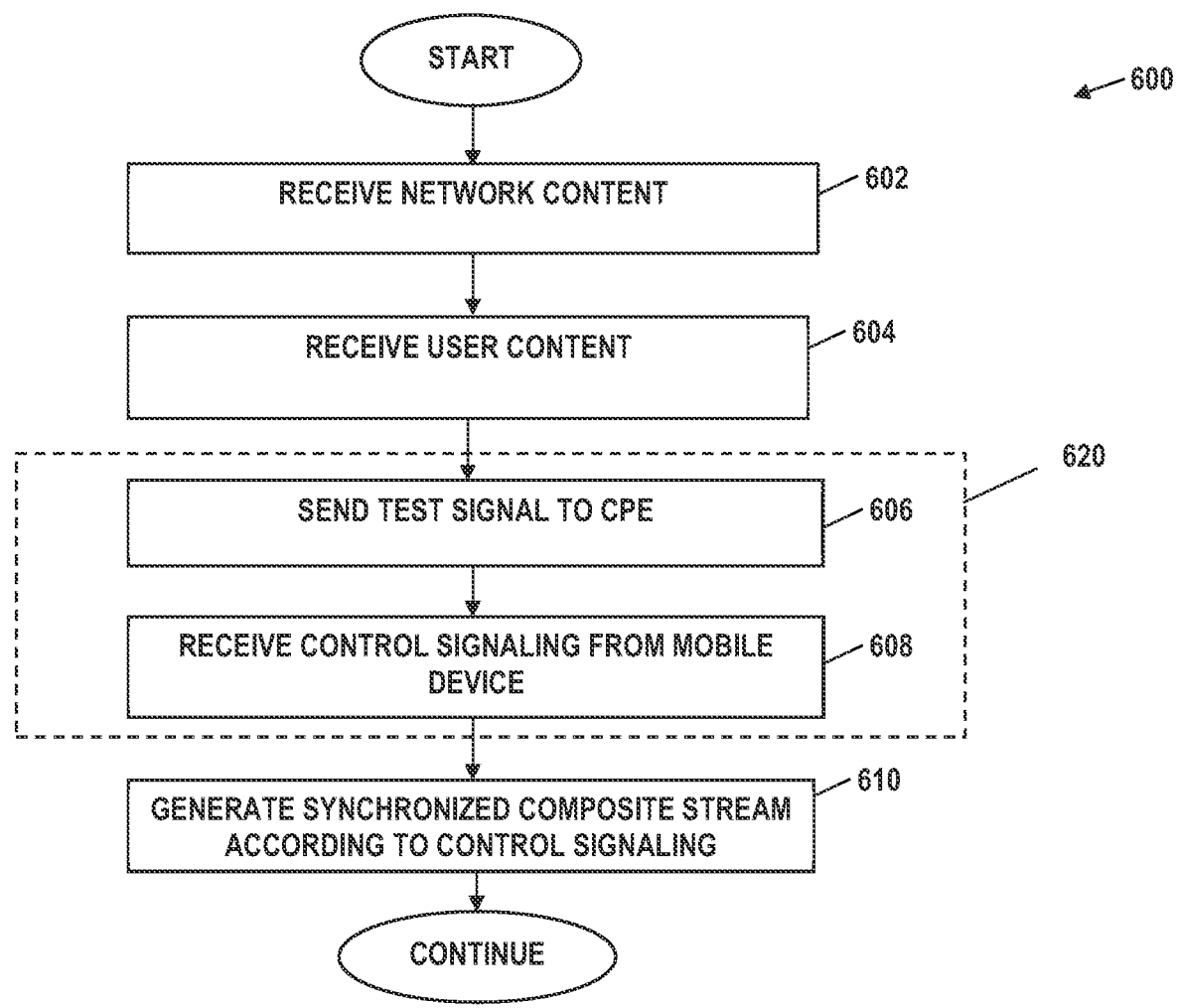
FIG. 6 is a logical flow diagram illustrating one exemplary embodiment of a method for synchronizing two different content streams via time-synchronizing based automation, according to the present disclosure.

As discussed in further detail in FIGS. 5 and 6, the synchronization according to various embodiments can be performed based on a manual adjustment process or an automated process (referred to as "time-synchronization based automation"). According to the manual adjustment process, in some variants, the TV/STB 206a can receive the composite stream and display both the network and user content (e.g., side by side). The display provides a visual cue to the user who can indicate the delay factor (i.e., the time factor to forward or delay the user content frame(s)) to the OES 352. The user can relay this delay factor to the OES 352 by transmitting signaling information (via control signaling-A 356 as shown in FIG. 3a) to the OES 352. The signal information indicates this delay factor (e.g., + or −) value as multiple of frame or time units (e.g., each time unit can be $\frac{1}{30}^{th}$ second for video with 30 fps). The OES 325 then uses this delay factor to adjust the user content frame sent by video capturing device 206b with the network content to create the EVS.

Alternatively, according to the time-synchronization based automation method, in some variants, before the OES 352 combines the user content from video capturing device 206b with the network content, the OES 352 will first perform a delay estimation. The delay estimation includes the OES 352 first sending an audio or other test tone or pattern to the TV/STB 206a. This can be accomplished in one approach with different frequency tones in sequence with time references (e.g., 1 khz for 1 second, then 3 khz for 2 seconds, and a reset tone of 500 hz for 1 second). The video capturing device 206b then captures these audio/test tones from the TV/STB 206a, and sends them to the OES 352. This creates a feedback loop for the OES to estimate the delay factor between (i) the time that user sees the video of the network content and (ii) the time the user content reaches the OES352.

It will be appreciated that the video capturing or other device used to perform the audio/test tone or pattern capture can also be configured to generate the estimation of loop delay (or partial loop delay). Specifically, in one configuration contemplated herein, the data relating to the audio/test tone or pattern can be sent "raw" to the OES (or a proxy thereof designated to perform the delay determination), such that the OES or the proxy can perform the determination itself, such as via timestamped values based on a synchronized reference clock source such as SI time or other. The time stamps may be applied for example by the receiving video capture or other user device. However, as an alternative, the capture or user device may itself perform the determination, such as based on temporal information gleaned from the transmission of the signal downstream to the CPE, and the SI or other temporal reference, and merely send the determined delay value to the OES as processed (versus raw) data. In either configuration, any delay or unpredictability associated with the upstream (video/audio capture device to OES) signaling channel can be eliminated, since the upstream video/audio content (contrast signaling) data is transported via a known, low-latency and highly predictable bearer (for instance 3GPP 5G NR link). As such, the delay data or estimate is based on the (i) network to CPE, and (ii) CPE to capture/user device, delays, and not the control signaling channel delay.

It will also be appreciated that other types of test patterns may be used consistent with the various aspects of the present disclosure, including for estimation of loop (or partial loop) delay. For example, an optical mechanism such as a QR code or radio frequency signal (e.g., a short range NFC-based signal which can be detected by a user's smartphone when placed proximate to the transmitter, the latter which may for instance be a dongle or card or module which is in data communication with the CPE).

After the delay estimation procedure is performed, the OES 352 then uses this delay factor to compose or combine the user contents with network content (e.g., POV) to create the EVS. The test tone can be disabled or turned-off after the delay estimation procedure is completed.

Accordingly, regardless of which of the foregoing processes are used (i.e., the manual adjustment process or the time-synchronization based automation process), the control signaling-A (see FIG. 3a) is received at the OES 352 (per step 410). The OES 352 then generates the EVS (i.e., a composite stream where the time reference between the network and user content is synchronized) according to the delay factor indicated by control signaling (per step 412). In some implementations, the EVS is generated by adjusting the frame(s) of the user content and/or the network content. In other implementations, the EVS is generated by re-generating a new composite stream. For example, the EVS can multiplex the different streams respectively carrying the network content and user content.

In one particular exemplary embodiment, the composite content stream may be generated (per step 406 above) from a source file, which the OES 352 may utilize to adjust and synchronize the frames. More pointedly, each stream (e.g., the stream carrying the network content, the stream carrying the uploaded user content, and the generated composite stream) comprises a stream of key frames (e.g., I-frames) at a certain temporal distance (e.g., 2 seconds or 10 seconds) apart. Key frames may be placed in any number of temporal distances from 0 (i.e., every frame is a key frame), to a single key frames and all delta frames per stream. A greater number of key frames allows the video stream to be segmented in a greater number of places (however, the amount of compression available may be limited where the number of key frames used is higher, but processing of the video frame would correspondingly be less because the full image does not have to be generated from predictive delta frames as frequently). Each of the plurality of streams may include the key frames at different resolutions or encodings or may have different data in the portions between key frames. The different data may include descriptive metadata of the content, or demographics/psychographic profiles of expected users, or information regarding how the data within the stream is formatted. With respect to the EVS, the OES 352 may modify the source file to modify the time references associated with the key frames such that they are synchronized according to the delay factor.

At step 414, the OES 352 can transmit the EVS to one or more entities. In one exemplary embodiment, the OES 352 can send the EVS to content distribution system 302 for other viewers to consume (e.g., via social media such as YouTube, Twitch, etc.). In another embodiment, the overlay encoding server can send the EVS to a client device 206 (e.g., 206a and/or 206b in FIG. 3a, or other) in order for the user to review and/or edit the EVS.

Referring now to FIG. 5, one exemplary embodiment of a method 500 for synchronizing two different content streams via a manual adjustment process 520 in accordance with the present disclosure is provided. Although the steps of method 500 are at least substantially performed by a client device (e.g., TV/STB 206a in FIG. 3a), in practical embodiments, some of these steps (or sub-steps within each step) may be implemented in parallel, on different hardware platforms or software environments, performed iteratively, deleted, and so forth.

At step 502, the network content is received. In various embodiments, the network-sourced content is received by the TV/STB 206a over HFC utilizing DOCSIS. The control signaling received (per step 504) may allow the client device to tune to a certain channel or content source, such as where the user wants to insert or inject his or her own content (e.g., locally generated content).

At step 506, the network-sourced content is displayed. In some exemplary embodiments, a user may watch the network content on TV/STB 206a and generate user content on another client device 206b (such as a smartphone), and upload that user content to the OES 352 using 5G NR services. The use of 5G/NG-RAN for upload video feeds provides a stable bit pipe with expected bandwidth and latency as previously noted. The OES 352 receives the network content from the CDN 302 and is configured to combine the network and user content (uploaded via use of 5G) into a composite stream. Accordingly, as the network content is received over HFC, and the user content is uploaded via use of 5G, the network content will likely be delayed in the composite stream generated by the OES.

At step 508, the unsynchronized composite stream is received. That is, the composite stream with both the network and user content that are not synchronized is received at the TV STB 206a from the OES 352.

According to the manual adjustment method, the TV/STB 206a can display both the network content (e.g., POC) and the user content (e.g., side by side), per step 510. This provides a visual cue (per step 512) to the user, who can indicate the delay factor (i.e., the time factor to forward or delay the user content frame) to the overlay encoding server by providing signaling information. The signaling information is sent (via control signaling-A 356 in FIG. 3a) to the OES 352, and indicates this delay factor (e.g., + or −) value as multiple of frame or time units (e.g., each time unit can be $\frac{1}{30}^{th}$ second for video with 30 fps). The OES 352 then uses this delay factor to adjust the user content frame sent by video capturing device 206b with the network content to create the EVS.

Referring now to FIG. 6, one exemplary embodiment of a method 600 for synchronizing two different content streams via time-synchronization based automation in accordance with the present disclosure is provided.

Method 600 starts at step 602 at which the network-sourced content is received. In various embodiments, the network content is received at the OES 352 from the CDN 302.

At step 604, the user content is received. In various embodiments, the user content is uploaded to the OES 352 via an IP session established using a 5G NR connection. The use of 5G/NG-RAN for upload video feeds again provides a stable bit pipe with expected bandwidth and latency.

According to the time-sync based automation process 620, before the OES 352 combines the content uploaded from client device 206b with the network content, the OES 352 will first perform a delay estimation. In one exemplary embodiment, the delay estimation includes the OES 352 first sending an audio or test tone to the TV/STB 206a, per step 606 of the type previously described. The client device 206b then captures these audio/test tones from the other client device 206a and sends it to OES 352 (e.g., via control signaling-A 356 as shown in FIG. 3a). The OES 352 then receives the test tones (e.g., via control signaling-A as shown in FIG. 3a) per step 608. This creates a feedback loop for the OES 352 to estimate the delay factor between the time that user sees the network video on TV/STB 206*a* and the time the user content reaches the OES 352.

After the delay estimation procedure is performed, the OES 352 then uses this delay factor to composite the user content with the network content to create the EVS (i.e., a composite stream where the time reference between the network content and user content is synchronized), per step 610. The test tone can be turned-off after the delay estimation procedure is completed.

It will be noted that in the exemplary embodiment, the use of the 5G NR bearer for delivery of content to the encoding server enables a degree of certainty at least with regard to delivery of the user-sourced or other enhancement content in that the extremely low maximum latency "guarantee" associated with the 5G NR bearer effectively sets a tight window for purposes of total delay estimation and/or synchronization. Specifically, by knowing that the maximum bearer-induced temporal latency is on the order of 1.0 ms, that "leg" of the process will in effect always be within 1 ms, whether the actual latency experienced in any given scenario is near zero, or at 1.0 ms. Stated differently, the most that this leg of the delivery process can be off by (plus or minus) is 1.0 ms, which is effectively insignificant from a user temporal synchronization perspective. The other portions of the overlay encoding process which are being characterized by virtue of the control/signaling processes described elsewhere herein (e.g., audio-based delay estimation) will constitute the far greater portion of any temporal mismatch or error component(s).

Exemplary Overlay Encoding Server (OES) Apparatus

Figure 7:
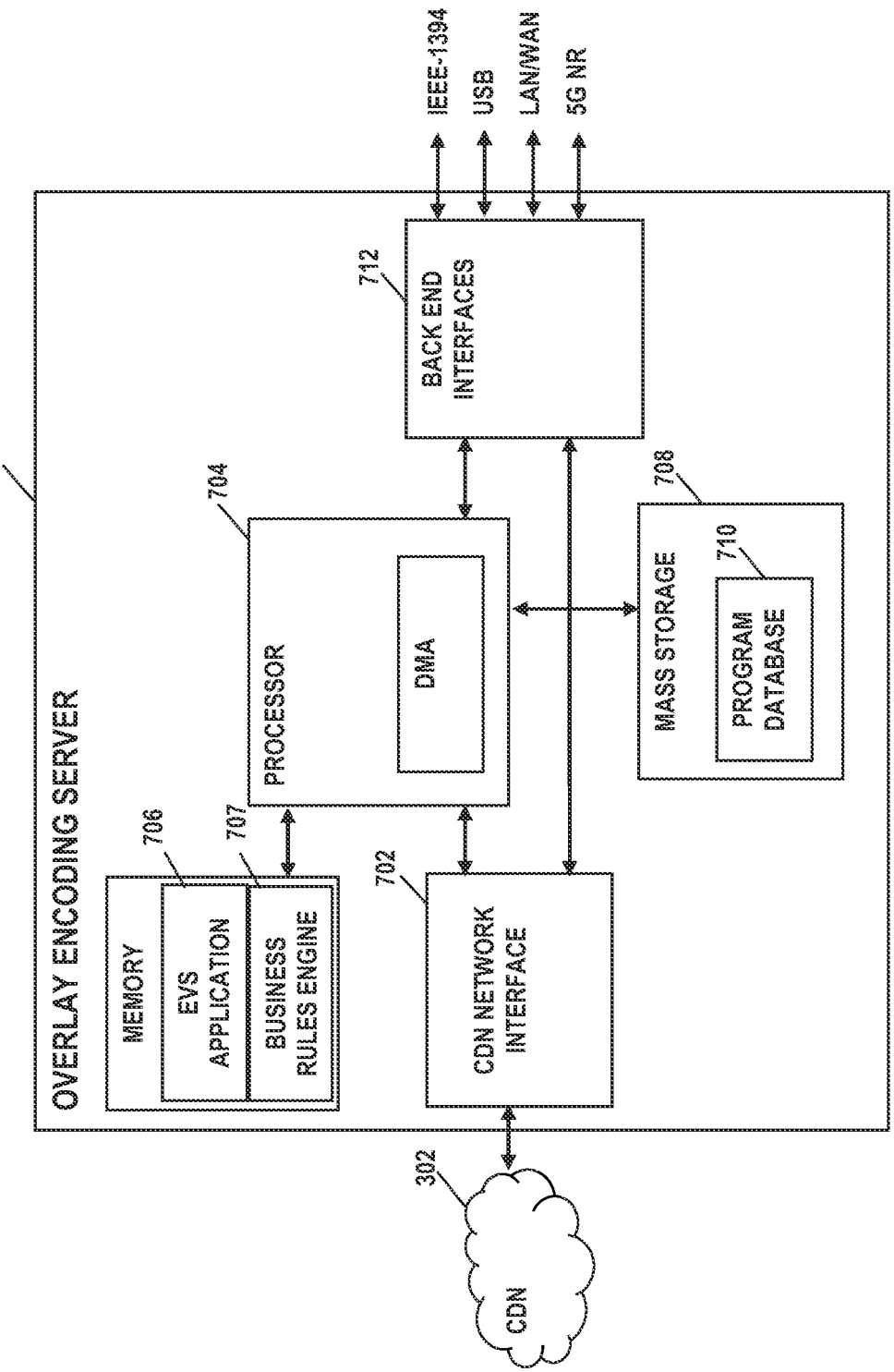
FIG. 7 is a functional block diagram illustrating one embodiment of an overlay encoding server apparatus for use in delivering enriched content to users according to the present disclosure.

Referring now to FIG. 7, an exemplary embodiment of an overlay encoding server (OES) apparatus 352 is illustrated. As shown, the OES 352 generally comprises a network interface 702 for communication with the content delivery network (CDN), 302, and various backend interfaces 712 for communication to other entities including for example the 5G NR infrastructure (e.g., 5GC, AMF, or other relevant components/processes), supervisory processes such as local UI/operating terminals, LANs/MANs, etc. Communications with for distributing the EVS externally may also occur via the CDN network interface and/or one of the backend interfaces, depending on configuration, QoS, or bandwidth requirements, etc.

In one exemplary embodiment, the OES 352 is configured to communicate via the aforementioned interfaces 302, 712 and interposed infrastructure with the CPE (e.g., TV/STB) 206*a*, the 5G-enabled client device 206*b*, and CDN 302 entities. In particular, the OES 352 requests content from a headend or edge cache entity (e.g., content server) for processing thereof in order to incorporate/combine the uploaded content into a composite stream (e.g., SPTS) for transmission to the CPE (e.g., TV/STB) 206*a*.

In some exemplary embodiments, the various backend interfaces 712 enable the OES to communicate with the MSO backbone and Internet and the 5G core 273, the latter in order to receive the user content uploaded from client device 206*b* via an IP session established over a 5G NR connection.

The OES further comprises a processor 704 and associated memory and mass storage 708. As shown, the processor 704 is configured to run at least an EVS application 706 and an operational/business rules engine 707 from program memory.

The EVS application 706 enables the combination of the user content with the network programming (and in some variants, other user content, as well as enables presentation of the composite content stream. For example, the EVS application 706 can generate and provide presentation information; generally, the presentation information dictates how the combined content is to be presented to e.g., another subscriber or set of subscribers, to the user, to advertisement engines, etc. In one variant the OES combines user generated data with other programming for presentation to another entity (such as another subscriber's CPE). In other variants, the OES 352 combines the user generated data with other user generated data to further improve targeted programming (e.g., improving targeted advertisements). Is still other variants, the OES directly provides the user generated data to other users.

Consider for example, a personalized channel. A user requests (or schedules ahead of time) a personalized channel. The CMTS grants the OES 352 an appropriate fixed time slot allocation to support an audio, and video stream based on the device information (e.g., MAC information). Thereafter, the OES routes the EVS channel according to the routing information via a BSA server or other content distribution mechanism for delivery to other subscribers. Finally, the BSA or other server provides the personal channel to any subscribers according to the presentation information.

Further, in some embodiments, the EVS application 706 enables the OES to determine time references associated with the respective content, add or remove content to/from a stream (e.g., multicast), cause content to be forwarded or delayed, and otherwise monitor network conditions and requests for content. The aforementioned determination of time references may occur via receipt of control signaling, evaluation of requests received from the client devices 206, pre-stored operator determined rules, evaluation of network conditions, etc. The EVS application 706 is configured to create and/or dynamically update a database 710, which contains content or data representative thereof that is received/uploaded.

In one embodiment, the EVS application or engine 706 determines the audio signal sent to the CPE (e.g., TV/STB) 206*a* by identifying time references and determining frequency tones in sequence with the time references (e.g., 1 khz for 1 second then 3 khz for 2 seconds and a reset tone of 500 hz for 1 second), as previously described. After these audio/test tones are sent to the CPE (e.g., TV/STB), and the client device 206*b* captures these test tones and sends it to OES 352, the EVS engine 706 and/or EVS application can estimate the delay factor between the time that the user sees the network content on CPE (e.g., TV/STB) 206*a* and the time the uploaded content reaches the OES. Other mechanisms for determining the delay factor may be used as well.

As shown, the database 710 may be stored at the mass storage 708 of the OES 352; alternatively the database may be located remote to yet in communication with the OES (e.g., virtual/cloud storage). Additionally, although illustrated as an individual applications 706 running on the server 352, it is appreciated that the foregoing functionalities may comprise an individual application, or alternatively one or more distributed applications running on a plurality of entities in data communication with one another (including one or more network entities); e.g., the network may be configured with a first server for a first application/function, a different server for a second application/function, and so forth.

The operational/business rules engine 707 in various embodiments enables the OES 352 to define rules for, e.g., (i) determining how to synchronize content, (ii) determining which content can be "synchronized with" (i.e., what is eligible or accessible to that particular CPE or subscription account for combination with user upload data, or more generally what themes, genres, etc. are eligible (such as where "first run" or HPoV content is not eligible, but other types of content are, or where particularly sensitive, restricted or controversial content is not eligible); (iii) user privileges in conjunction with the EVS, based on e.g., subscription plan or tier, and yet others.

In one particular implementation, various ones of the applications disclosed herein are disposed at one or more headend entities (see e.g., FIGS. 2a-2b). A servlet application may also be provided to facilitate communication between the various applications and one or more client applications resident on the user's premises system. The servlet, in one embodiment, acts as a proxy for communication between a client device and various media applications also located at or in communication with the headend. Users associated with the device may access the media features and applications using client software applications running on the client device. The client devices 206 and OES 352 communicate via the HFC network or other bearer medium (such as via an out-of-band upstream RF channel, an upstream DOCSIS channel, an upstream enhanced media application channel, or a separate transport such as a wireless or other IP network (not shown) which, in some variants, is established using 5G NR). In this manner, a user at his/her premises or client device, may access and interact with various ones of the applications in an integrated fashion.

In another implementation, individual ones of the applications are in communication with an Internet host server in order to obtain data therefrom, such as via a gateway device located at e.g., the headend of the network. In other words, the gateway device requests and receives Internet data and/or content from the host servers on behalf of the application(s). The data and/or content is then processed as required and, via the servlet, delivered to one or more client devices. For example, the content may be de-encapsulated from a first container format, and re-encapsulated into a second format for delivery to the client device. The content may also optionally be transcoded and/or transrated if desired.

Exemplary CPE

Figure 8:
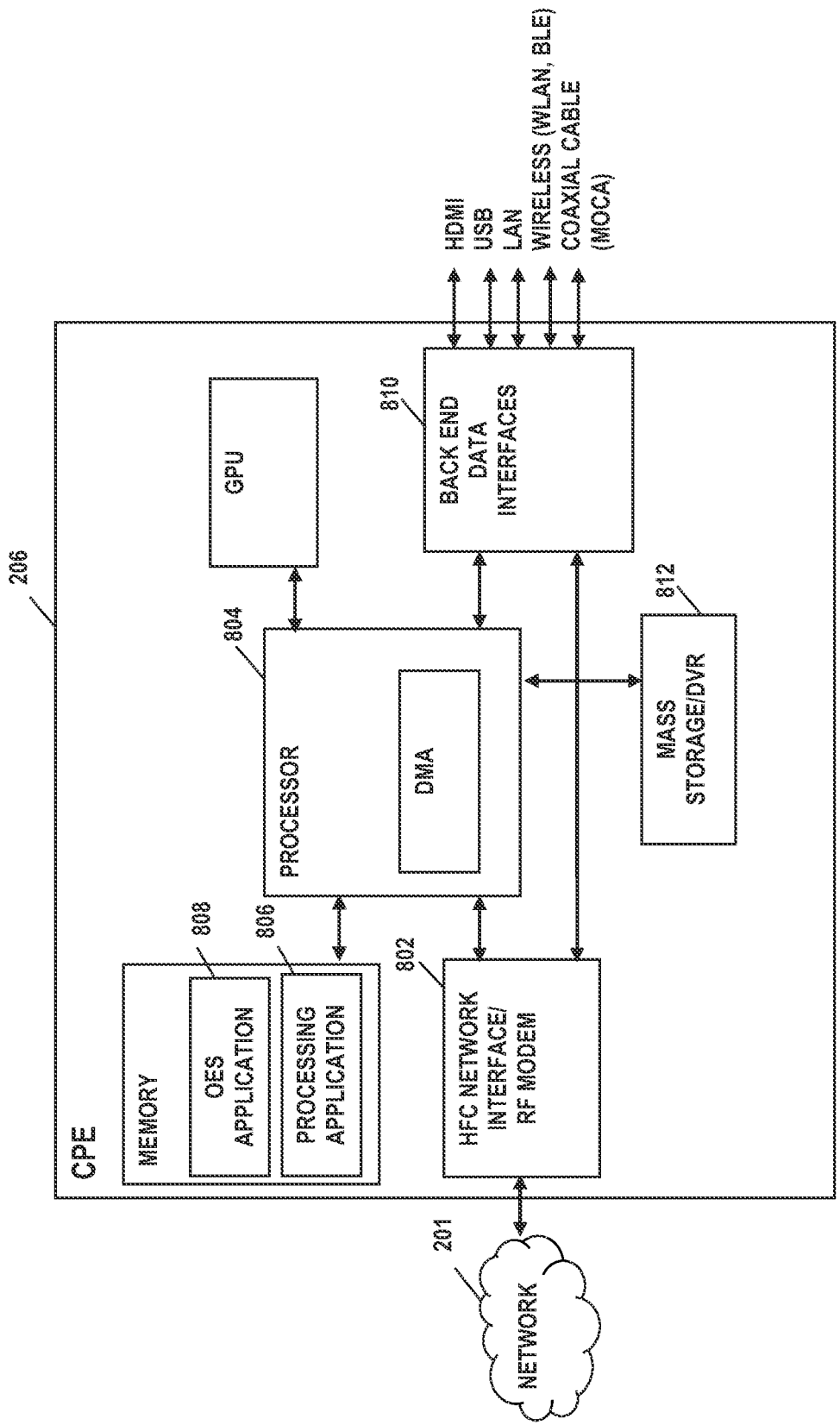
FIG. 8 is a functional block diagram illustrating one embodiment of a CPE for use in delivering content over HFC to users according to the present disclosure.

Referring now to FIG. 8, one exemplary embodiment of the CPE 206 is illustrated. In various embodiments, CPE 206 corresponds to client device 206a in FIG. 3a. Exemplary incarnations of the CPE include settop boxes (e.g., DSTBs), television sets (e.g., Smart TVs), laptop and desktop computers, personal media devices (PMDs), gateways, etc. As shown, the CPE 206 comprises an HFC network interface 802, processor 804, mass storage 812, memory, and backend interfaces 810.

The network interface 802 in one embodiment may comprise an RF tuner/modem (discussed below), or a cable modem, such as e.g., a DOCSIS 3.0 compliant cable modem of the type discussed in "DOCSIS® 3.0 *Management Features Differences Technical Report*" CM-TR-MGMTv3.0-DIFF-V01-071228 and "*DOCSIS* 3.0 *OSSI Configuration Management Technical Report*" CM-TR-OSSIv3.0-CM-V01-080926, each of which is incorporated herein by reference in its entirety. The cable modem can provides DOCSIS connectivity to the CPE to be used for network communication (such as communication with the OES 352), as well as various other purposes (such as VOD, Internet "surfing," interactive program guide (IPG) operation, etc.).

The network interface 802 of the CPE 206a further comprises one or more QAM tuners configured to receive content from the HFC network 101. The RF tuner(s) may comprise traditional video RF tuner(s) adapted to receive video signals over, e.g., a QAM. For example, the RF tuner(s) may comprise one or more tuners, a demodulator, decryption module, and demultiplexer of the type well known in the art, although other configurations may be used. The number and type of QAM tuners utilized in the CPE 800, as noted above, may be varied so as to ensure tuning across the entire available spectrum. Alternatively, different classes of devices may be provided each class having a different tuning range capability.

For example, the CPE 206a may include a wide band tuner, such as that discussed in previously referenced co-owned, co-pending U.S. Patent Application Publication No. 20060130113 entitled "METHOD AND APPARATUS FOR WIDEBAND DISTRIBUTION OF CONTENT" and filed Dec. 14, 2010. The wideband tuner arrangement enables the CPE to receive content associated with one or more program streams distributed across two or more QAMs. Additionally, the RF tuner(s) may incorporate functionality to modulate, encrypt/multiplex as required, and transmit digital information for receipt by upstream entities such as the CMTS. The tuners may additionally be capable of tuning across the entire band of QAM channels such as those developed by e.g., Texas Instruments and Broadcom.

The CPE can assume literally any discrete form factor, including those adapted for desktop, hand-held, or wall-mounted use, or alternatively may be integrated in whole or part (e.g., on a common functional basis) with other devices (such as the 5G-enabled client device 206b) if desired. Additionally, the CPE 206a may include other elements and interfaces such as for example an interface for the Home-Plug A/V standard which transmits digital data over power lines, Wi-Fi capability, a PAN (e.g., 802.15, Bluetooth Low Energy (BLE), or other short-range wireless interface for localized data communication), HDMI interface, etc.

The CPE processor 804 is configured to run a processing application 806 and an OES application 808 thereon from program memory. The processing application 806 and OES application 808 enable the CPE to perform the processing, display the received content (as discussed above with respect to steps 506 and 510 of FIG. 5). In one variant processing may include de-encapsulating the received Internet content from a first media file container format and subsequently re-encapsulating the Internet content to a second media file container format, transcription, translation, and/or transcoding. In one exemplary embodiment, content is converted from multicast to unicast via network address translation by the processing application 806.

Additionally, although illustrated as an individual applications 806, 808 running on the CPE, it is appreciated that the foregoing functionalities may comprise an individual application, or alternatively one or more distributed applications running on a plurality of entities in data communication with one another (including one or more network entities); e.g., the CPE may be configured with a first server (e.g., VOD server) for a first application/function, a different server (e.g., OES) for a second application/function, and so forth.

It will be appreciated that the various applications 806, 808 may also be configured to position data further toward the edge of the network (including even at the user's CPE or mobile device) so as to facilitate the various functions thereof. For example, information regarding a user's contacts/friends, activities, playlists, etc. may be disposed on the user CPE 206a, including their mobile device 206b (e.g., smartphone or tablet). This approach provides at least two benefits, including: (i) pushing further processing necessary to support the applications out to the edge of the network (or even onto the user device), so as to minimize core network bandwidth/resource consumption; and (ii) in the case of mobile devices, useful data pertaining to a given user is available regardless of where/how the user associates with the host network; e.g., at a Wi-Fi hotspot that is not associated with the user's premises, for example. Once the user has associated with the hotspot, they can log into the managed network (e.g., cable or satellite network) as a subscriber or user, and accordingly obtain access to the services provided by the network infrastructure while in effect being "away from home".

Various options may be utilized to protect content as it is transmitted to the CPE 206a. In one embodiment, the OES 352 is configured to rotate a common key for a multicast. Alternatively, this may be provided at e.g., the CDN 302. Signals transmitted to the CPE 206a which include key updates are flagged (such as by a TS header). Receipt of these flags at the CPE triggers the CPE to pull the corresponding key from a key server via an authenticated HTTPS. The CPE 206a can then transcript content from multicast to unicast (as discussed above) via the key. In addition, the CPE may store client/session specific keys for use during playback.

In another variant, the CPE can be configured to use one tuner and associated digital processing chain to receive and encapsulate a first stream destined for one multicast address, while using a second tuner to receive an already IP-encapsulated stream, such as via a normal DOCSIS QAM or the like. Hence, the CPE can act as a hybrid "switched" IPTV/non-switched IP device for multiple CPE in the premises.

The CPE 206a may process received content automatically into various alternative encapsulation formats or, may encapsulate as needed to the format of the specific requesting device. The processed content may also be stored at the CPE or other data storage (whether at the premises or network) such as the mass storage device/DVR 812 for future use for transmission to other client devices requesting the same content in the particular new format.

Exemplary 5G-Enabled User Device

Figure 9:
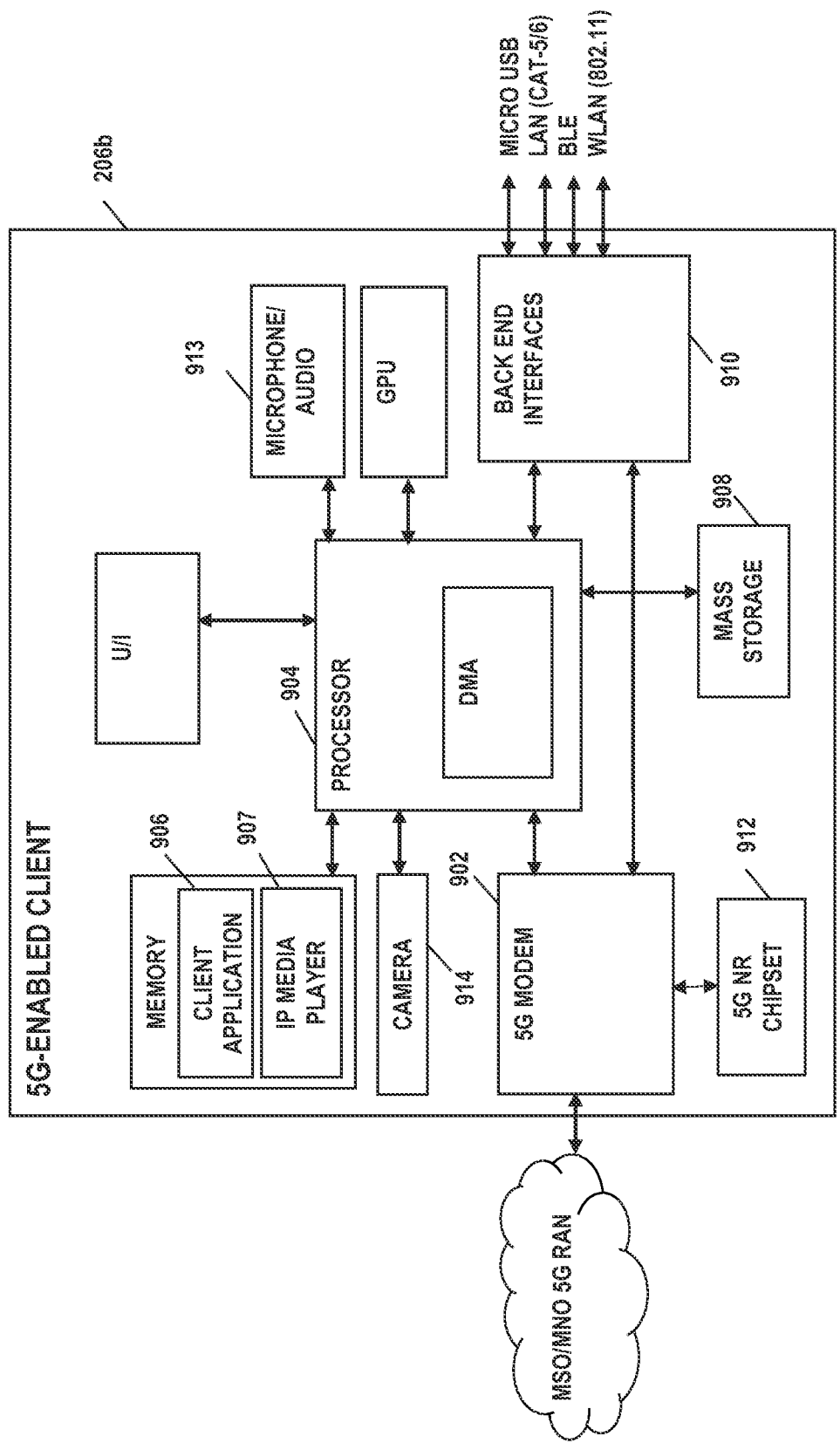
FIG. 9 is a functional block diagram illustrating an exemplary embodiment of a 5G-enabled client device according to the present disclosure.

An exemplary 5G-capable user device 206b useful with the present disclosure is illustrated in FIG. 9. The 5G-capable client device may comprise any device capable of receiving/transmitting and encoding/decoding IP packetized content via use of 5G NR services, whether for display thereon, or for recording, display, or storage on a device in communication therewith. Exemplary devices include laptop and desktop computers, cellular smartphones, personal media devices (PMD), and other mobile devices, although other types of devices (fixed, IoT, etc.) may be substituted.

As shown in FIG. 9, the 5G-enabled client device generally includes e.g., a network interface 902, a processor 904 and associated storage 908, and a plurality of various back end interfaces 910 for communication with other devices, such as WLAN, BLE, Ethernet, HDMI, and USB/micro-USB or USB OTG.

In the illustrated configuration, the 5G network interface 902 enables communication between the 5G-enabled client device 206b and the 5G RAN. In one embodiment, the 5G-enabled client device includes a 3GPP 5GNR-capable user equipment (UE) chipset 912. The UE chipset 912 is configured to receive digital I/Q synchronization signal(s) for 5G, enabling downstream and upstream modes of the respective TDD carriers. The 5G interface may also be used in one implementation to support the signaling interface between the client device 206b and the overlay encoder 352, such as via an embedded 5G or IoT (e.g., NB-IoT or eMMC) channel provided for in the 5G Release 15 and subsequent specifications.

In various embodiments, the processor 904 may be configured to load and run a media player 907, such as an HTML5 video player, in order to play the received/captured content. The media player 907 in one embodiment is compatible with the aforementioned WebSocket protocol, however as indicated throughout the present disclosure WebSocket compatibility is not required as the present disclosure provides a protocol agnostic mechanism for providing IP packetized content. DRM and/or Conditional Access (CA) functionalities may also be implemented and supported at the media player 907.

The processor 904 also runs a client application 906 for requesting, capturing, sending, and/or displaying content. The client application 906 may be in data communication with camera 914 in order to capture media, as well as the microphone/audio module 913 to capture test tones. The client application 906 can also be configured to upload content and send control signaling (e.g., control signaling-A 356 as shown in FIG. 3a) to the overlay encoding server 352.

In yet another embodiment, the 5G-enabled client device further comprises a SSD, flash memory (e.g., NAND or NOR flash) or hard drive in communication therewith or integrated therein which may act as a digital video recorder (not shown).

Exemplary Use Cases

In various embodiments, the network architecture 350 of FIG. 3a can be utilized for enabling direct user interaction with content. The direct interaction includes interaction (including manipulation) with content by a single user. Various exemplary implementations of or models for direct interaction according to the invention are discussed herein below.

As disclosed above, various embodiments of exemplary methods for synchronizing two different media stream is illustrated in FIGS. 4-5. As shown, the method 500 of FIG. 5 includes the steps of displaying network content to the user (step 506). This enables the user to add user content therein (step 406 of FIG. 4), and subsequently enabling the user to publish their EVS for access by other users (step 414 of FIG. 4). The particular manipulation performed by the OES 352 may include for example enabling a user to, e.g., directly interact with content, as well as create a personal channel for (a) selling/auctioning, (b) broadcasting, (c) commentary, and (d) exercise/workout. In addition, each may be performed by leveraging premises bandwidth to a consumer device at a consumer premises, as well as wireless/5G capabilities on portable devices.

In one embodiment, the aforementioned personal channel may be a virtual channel of the type discussed in previously referenced co-owned, co-pending U.S. patent application Ser. No. 12/414,554 filed on Mar. 30, 2009 entitled "Personal Media Channel Apparatus and Methods", and issued as U.S. Pat. No. 11,076,189 on Jul. 27, 2021, which is incorporated herein by reference in its entirety. As discussed therein, a substantially user-friendly mechanism for viewing content compiled from various sources, including, inter alia, DVR, broadcast, VOD, Start Over, etc., and particularly that content selected to align with a user's preferences, is displayed as a substantially continuous stream as part of a "virtual" user-based channel. The "virtual channel" acts as a centralized interface for the user and their content selections and preferences, as if the content relevant to a given user were in fact streamed over one program channel. In another aspect, client applications (e.g., those disposed on a subscriber's client devices 206*a*, 206*b* and/or network servers such as the OES 352) are utilized to compile the playlist based on user-imputed as well as pre-programmed user profiles. Various feedback mechanisms may also be utilized to enable the client application to "learn" from the user's activities in order to update the user profile and generate more finely-tuned and cogent recommendations. Client applications may also be utilized to manage the seamless presentation of content on the virtual channel, and locate/flag various scenes inside selected content for user viewing or editing or insertion into other streams or playlists. The OES provides the personal channel to any subscribers.

a. Selling/Auctioning

In one embodiment, the network architectures, apparatus, and methods disclosed herein may be used to enable a user to create a sales channel composed of e.g., currently broadcast content, recorded content, web or other network-based content, and/or user-generated content (i.e., that generated indigenously by the user, such as via their webcam or portable video camera or smartphone), etc. For example, the network content (e.g., network-sourced content) sent via the downlink can be an ocean or landscape or sky scene, and the user may merge their items for sale with the network content to create more dynamic content.

b. Broadcasting

In another embodiment, the user may further manipulate content by creating a broadcast channel with network-sourced such as tourist areas like Bangkok or Hong Kong (wherever it fits the user's publishing angles), to accompany any content the user chooses. For example, the network content (e.g., network-sourced content) sent via the downlink can be an scene at a popular night-life area at Lan Kwai Fong in Hong Kong, and the user may merge their opinions or suggestions of which establishments in that area are well rated to create more lively viewing and better ratings.

c. User Commentary

In yet another embodiment, the user may further create a running commentary to accompany any content the user chooses. For example, the user may play the role of an active viewer to network content by chiming in with jokes, information, etc. during a content playback. The creator may in some instances be a celebrity (such as an actor, director, etc. of the program) or may gain notoriety via the commentary. Real-time commentator type of broadcasting is also very popular for gamers (e.g., Twitch) to allow audiences to participate the actions being played by gamers. See e.g., co-owned and co-pending U.S. patent application Ser. No. 13/619,951 filed Sep. 14, 2012 and entitled "APPARATUS AND METHODS FOR PROVIDING ENHANCED OR INTERACTIVE FEATURES," which is incorporated herein by reference in its entirety, which discloses exemplary methods and apparatus for utilization of enhancement content or data consistent with the present disclosure.

With the high bandwidth availability in the upstream (premises-to-network) via an IP connection using 5G NR, and downstream (network-to-premises) directions via, e.g., in-band channel or DOCSIS QAM, the communications between the OES 352 and the client devices 206 are effectively real time, and allow for substantially latency-free operation.

d. Exercise/Workout

In yet another embodiment, the aforementioned synchronization processes may be further utilized to enable webcam/video feed to be uploaded from one or more client devices for generation of a personal training exercise session. For example, a subscriber may tune to a broadcast exercise "episode", upload webcam or other video data to the OES 352, and receive in return a modified video feed (EVS) of the episode and the subscriber's webcam feed, as well as a webcam feed from other subscribers also tuned to the "episode" (such as in a PIP, thumbnails, or other minimally-invasive overlay).

In one variant, a personal trainer performs the exercises, and the subscribers follow along. Through the use of the subscriber webcam/video feeds uploaded to the network and provided to the trainer's video feed, the trainer (or other people having access to the feed(s)) can motivate the subscriber, tell them what they're doing wrong, etc. One or more client applications 806, 808, 906 may enable the user at e.g., a user interface, to manipulate a display of the modified video feed (i.e., the episode and subscriber webcam feeds) so as to enlarge, shrink, move, etc. various ones of the feeds.

In one variant, the costs associated with the training sessions may be spread across a plurality of users or "friends", so that each receives a discount over what he/she would pay for an individual session. The so-called friends may be physically located in the same space, or electronically linked in a single session as discussed above. These users may have no relation or correlation with one another (e.g., may be just random users desiring to engage in the session), or may have a pre-existing relationship, the latter which may be used to identify them in the first place, identify other complementary offers or items of interest, select targeted advertising, etc.

d. "On-the-fly" Advertising

In yet another scenario, temporally and/or contextually relevant advertising can be generated and merged or combined with "primary" content, so as to create a living advertisement of sorts. For instance, a given primary content stream or element may have a prescribed theme, product placement, or other attribute which an advertiser (or network operator or other entity) wishes to leverage in real time. As such, in one variant, the user device (e.g., the video/audio capture device 206*b*) is utilized by an entity affiliated with the advertiser (or its proxy) to generate secondary content that can be temporally synchronized with the primary content to generate the composite stream. For example, consider a movie or program which prominently features a particular brand of car in its plotline; the manufacturer or dealer of that car can arrange for a "live" advertisement feed from say the dealership or a test track, synchronizing the video/audio to the primary content (e.g., a scene in the movie where the car is featured).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computer-readable apparatus comprising a non-transitory storage medium, the non-transitory storage medium comprising a plurality of computer-executable instructions configured to, when executed by a processor apparatus of a computerized network apparatus, cause the computerized network apparatus to at least:
   receive, at the computerized network apparatus, and based at least on first control signal data, a first type of content via at least a portion of a hybrid fiber coaxial (HFC) content distribution network;
   receive, at the computerized network apparatus, a second type of content generated by a client device and transmitted upstream to the computerized network apparatus via at least a 3GPP (Third Generation Partnership Project) 5G NR (Fifth Generation New Radio) radio access technology operating according to a prescribed maximum latency;
   based at least on second control signal data received via the 3GPP 5G NR radio access technology and at the computerized network apparatus, generate synchronized combined content using at least the received first and second types of content, wherein the prescribed maximum latency of the 3GPP 5G NR radio access technology is (i) necessary to support at least one temporal synchronization used for the generation of the synchronized combined content, and (ii) eliminates at least a portion of a calculation used for the at least one temporal synchronization and relating to a delay associated with the second control signal data; and
   provide the synchronized combined content to a premises device.

2. The computer-readable apparatus of claim 1, wherein the at least one temporal synchronization used for the generation of the synchronized combined content comprises a temporal adjustment of one or more frames associated with one or more of (i) the first type of content or (ii) the second type of content, the adjustment based at least on the second control signal data.

3. The computer-readable apparatus of claim 1, wherein:
   the first type of content comprises network-sourced content obtained via at least one content source, the at least content source associated with at least one of (i) a content library, or (ii) a third-party content source other than the client device; and
   the second type of content comprises user-generated content, the user-generated content generated at the client device.

4. The computer-readable apparatus of claim 1, wherein:
   the client device comprises a media-capture device capable of data communication via the 3GPP 5G NR radio access technology; and
   the computerized network apparatus comprises a server apparatus associated with the HFC content distribution network.

5. The computer-readable apparatus of claim 1, wherein the plurality of computer-executable instructions are further configured to, when executed by the processor apparatus, cause the computerized network apparatus to at least:
   transmit a first test signal to the premises device;
   receive data relating to the first test signal from the client device, the client device configured to receive data relating to the first test signal from the premises device subsequent to the transmission of the first test signal; and
   based on the receipt of the data relating to the first test signal, estimate a delay factor;
   wherein the at least one temporal synchronization used for the generation of the synchronized combined content is further based on the delay factor.

6. The computer-readable apparatus of claim 5, wherein the delay factor comprises an indication of a temporal relationship between the first type of content and the second type of content, the indication of the temporal relationship configured to indicate whether to temporally advance or delay one or more frames associated with the second type of content with respect to one or more frames associated with the first type of content within the synchronized combined content.

7. A method of generating synchronized digital content data for use within a digital content distribution network, the method comprising:
   obtaining first digital content data via at least a portion of a hybrid fiber coaxial (HFC) network infrastructure of the digital content distribution network;
   obtaining, at a computerized network apparatus and from a first computerized client device associated with the digital content distribution network, second digital content data via an upstream communication using 3GPP (Third Generation Partnership Project) 5G NR (Fifth Generation New Radio) radio access technology having a prescribed maximum latency associated therewith;
   based at least on first control signaling received via the 3GPP 5G NR radio access technology, generating the synchronized digital content data based at least in part on (i) the first digital content data and (ii) the second digital content data, wherein the prescribed maximum latency of the 3GPP 5G NR radio access technology in the obtaining of the second digital content data via the upstream communication eliminates at least a portion of a latency associated with the generating synchronized digital content data based on at least the first digital content data obtained via at least the portion of the HFC network infrastructure; and
   transmitting the synchronized digital content data to a second computerized client device associated with the digital content distribution network.

8. The method of claim 7, wherein the generating of the synchronized digital content data comprises multiplexing at least a portion of the first digital content data and at least a portion of the second digital content data into a multi-program transport stream (MPTS).

9. The method of claim 7, wherein the generating of the synchronized digital content data comprises generating composite content data having at least a portion of the first digital content data and at least a portion of the second digital content data configured to be rendered simultaneously, the simultaneous rendering comprising one of (i) an overlay at least portion of at least one frame of the at least portion of the first digital content data over at least a portion of at least one frame of the at least portion of the second digital content data, (ii) side-by-side presentation of the at least one frame of the at least portion of the first digital content data and the at least one frame of the at least portion of the second digital content data, or (iii) an interleave of one or more frames of the at least portion of the first digital content data with one or more frames of the at least portion of the second digital content data.

10. The method of claim 7, wherein:
the obtaining of the first digital content data via at least the portion of the HFC network infrastructure comprises receiving the first digital content data responsive to second control signaling, the second control signaling performed with at least one first computerized network apparatus associated with the digital content distribution network, the at least one first computerized network apparatus configured to receive digital content data from a plurality of content sources other than the first computerized client device; and
the second control signaling is distinct from the first control signaling, the first control signaling performed with at least one second computerized network apparatus associated with the digital content distribution network, the at least one second computerized network apparatus configured to receive digital content data from one or more of (i) the at least one first computerized network apparatus, or (ii) the first computerized client device.

11. The method of claim 7, wherein the generating of the synchronized digital content data is based at least on data relating to a delay factor, the delay factor correlated to an amount of time between receipt of the first digital content data at the second computerized client device and the obtaining of the second digital content data at the computerized network apparatus.

12. The method of claim 11, wherein the generating of the synchronized digital content data comprises automatically adjusting at least one temporal aspect of at least one of the first or second digital content data based on the delay factor, the adjusting causing synchronization of the first and second digital content data.

13. The method of claim 7, wherein the second computerized client device comprises consumer premises equipment, the consumer premises equipment comprising at least one of (i) a digital content rendering device, or (ii) a digital set-top box.

14. A computerized network apparatus disposed within a digital content distribution network, the computerized network apparatus comprising:
a first data interface configured to perform data communication with a first client device;
a second data interface configured to perform data communication with a second client device;
processor apparatus configured for data communication with the first and second data interfaces; and
a non-transitory computer-readable apparatus comprising a storage medium, the storage medium comprising a plurality of instructions configured to, when executed by the processor apparatus, cause the computerized network apparatus to at least:
receive network-sourced digital content data from the digital content distribution network via the first data interface and over hybrid fiber coaxial (HFC) network infrastructure managed by a first network management entity;
receive user-generated digital content data from the second client device via the second data interface and utilization of 5G NR (Fifth Generation New Radio)-compliant radio access technology in order to utilize a specified temporal latency performance level thereof;
generate a composite digital content data stream based at least on synchronization of the network-sourced digital content data and the user-generated digital content data, wherein the specified temporal latency performance level eliminates a need to determine at least one variable used in a computation for the synchronization of the network-sourced digital content data and the user-generated digital content data; and
provide the generated composite digital content data stream to the first client device associated with the digital content distribution network.

15. The computerized network apparatus of claim 14, wherein,
at least portions of the 5G NR-compliant radio access technology is also managed by the first network management entity.

16. The computerized network apparatus of claim 14, wherein:
the first client device associated with the digital content distribution network comprises a consumer or user premises device configured to (i) perform data communication with the computerized network apparatus via the HFC network infrastructure and (ii) render the generated composite digital content data stream to a user; and
the second client device comprises a mobile client device configured to perform data communication with the computerized network apparatus via use of the 5G NR-compliant radio access technology.

17. The computerized network apparatus of claim 16, wherein the plurality of instructions are further configured to, when executed by the processor apparatus, cause the computerized network apparatus to perform at least a synchronization operation based on control signal data received from the second client device, the control signal data indicating an amount of delay between (i) one or frames of the first digital content data and (ii) one or frames of the second digital content data.

18. The computerized network apparatus of claim 17, wherein the plurality of instructions are further configured to, when executed by the processor apparatus, cause the computerized network apparatus to estimate the amount of delay based at least on (i) test data transmitted to the first client device, and (ii) information relating to the test data, the information received from the second client device, the information enabling a feedback loop associated with the computerized network apparatus, the first client device, and the second client device.

19. The computer-readable apparatus of claim 1, wherein the first control signal data comprises data indicative of one or more points in the first type of content where the second type of content is to be inserted.

20. The method of claim 7, further comprising receiving the first control signaling via the 3GPP 5G NR radio access technology and use of a real-time transport control protocol (RTCP).

21. The computerized network apparatus of claim 14, wherein the synchronization of the network-sourced digital content data and the user-generated digital content data comprises an automated process.

\* \* \* \* \*